(12) United States Patent
Amouie et al.

(10) Patent No.: US 12,344,294 B2
(45) Date of Patent: Jul. 1, 2025

(54) INSPECTION PORTAL SYSTEM AND METHODS THERETO

(71) Applicants: Norfolk Southern Corporation, Atlanta, GA (US); GEORGIA TECH RESEARCH CORPORATION, Atlanta, GA (US)

(72) Inventors: Mabby Nicholas Amouie, Atlanta, GA (US); Evan Thomas Gebhardt, Atlanta, GA (US); Colin Usher, Atlanta, GA (US); Alex Samoylov, Atlanta, GA (US); Howard Taylor-Bryce Darling, Atlanta, GA (US); Brian Thomas Yeager, Atlanta, GA (US); Thomas Samuel Fox, Atlanta, GA (US)

(73) Assignee: Norfolk Southern Corporation & Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/829,194

(22) Filed: Sep. 9, 2024

(65) Prior Publication Data

US 2025/0083719 A1    Mar. 13, 2025

Related U.S. Application Data

(60) Provisional application No. 63/582,165, filed on Sep. 12, 2023, provisional application No. 63/581,554, filed on Sep. 8, 2023.

(51) Int. Cl.
*B61L 27/57*    (2022.01)
*H04N 7/18*    (2006.01)
(Continued)

(52) U.S. Cl.
CPC ............. *B61L 27/57* (2022.01); *H04N 7/18* (2013.01); *H04N 23/56* (2023.01); *H04N 23/64* (2023.01); *H04N 23/90* (2023.01)

(58) Field of Classification Search
CPC .......... B61L 27/57; H04N 7/18; H04N 23/56; H04N 23/64; H04N 23/90
See application file for complete search history.

(56) References Cited

U.S. PATENT DOCUMENTS

| 4,915,504 A | 4/1990 | Thurston |
|---|---|---|
| 5,793,492 A | 8/1998 | Vanaki |

(Continued)

FOREIGN PATENT DOCUMENTS

| CN | 111483496 A | 8/2020 |
|---|---|---|
| CN | 111923962 A | 11/2020 |

(Continued)

OTHER PUBLICATIONS

Non-Final Office Action For U.S Appl. No. 18/829,189 dated Nov. 4, 2024, 18 pages.

(Continued)

*Primary Examiner* — Boubacar Abdou Tchoussou
(74) *Attorney, Agent, or Firm* — Bradley Arant Boult Cummings LLP; Daniel E. Sineway, Esq.

(57) ABSTRACT

Systems and methods for gathering data on passing vehicles can comprise a support structure spanning across a railroad track; an overhead inspection system attached to the support structure and comprising one or more cameras for gathering data on the top portion of the passing railcar; a first side inspection system and a second side inspection system attached to the support structure, and each comprising one or more cameras and one or more lights and configured to capture images of opposing sides of a railcar; an undercarriage inspection system comprising one or more undercar- (Continued)

riage inspection assemblies, each of which can comprise one or more cameras and one or more lights; and one or more tie-mounted inspection assemblies comprising one or more cameras and one or more lights.

18 Claims, 16 Drawing Sheets

(51) Int. Cl.
  *H04N 23/56* (2023.01)
  *H04N 23/60* (2023.01)
  *H04N 23/90* (2023.01)

(56) References Cited

U.S. PATENT DOCUMENTS

| | | | |
|---|---|---|---|
| 6,813,581 | B1 | 11/2004 | Snyder |
| 6,909,514 | B2 | 6/2005 | Nayebi |
| 7,681,443 | B2 | 3/2010 | Kilian et al. |
| 7,714,886 | B2 | 5/2010 | Kilian et al. |
| 7,715,026 | B2 | 5/2010 | Nayebi |
| 8,289,526 | B2 | 10/2012 | Kilian et al. |
| 8,480,008 | B1 | 7/2013 | Arnold |
| 8,668,136 | B2 | 3/2014 | Ahern et al. |
| 8,780,189 | B2 | 7/2014 | Kilian |
| 8,934,007 | B2 | 1/2015 | Snead |
| 9,033,219 | B2 | 5/2015 | Schoner et al. |
| 9,073,559 | B2 | 7/2015 | Kilian et al. |
| 9,129,248 | B2 | 9/2015 | Reynolds et al. |
| 9,438,754 | B2 | 9/2016 | Schoner et al. |
| 9,516,199 | B2 | 12/2016 | Kilian et al. |
| 9,625,607 | B2 | 4/2017 | Tudor et al. |
| 9,671,191 | B1 | 6/2017 | Sullivan et al. |
| 9,709,394 | B2 | 7/2017 | Schoner et al. |
| 9,836,893 | B2 | 12/2017 | Chundru et al. |
| 10,513,279 | B2 | 12/2019 | Mulligan |
| 10,523,858 | B1 * | 12/2019 | Arcaini ............... B61L 25/021 |
| 10,984,521 | B2 | 4/2021 | Kohler et al. |
| 11,107,233 | B2 | 8/2021 | Saniei et al. |
| 11,172,107 | B1 | 11/2021 | Hoeppner |
| 11,235,788 | B2 | 2/2022 | Snyder et al. |
| 11,285,980 | B2 | 3/2022 | Popplewell |
| 11,423,559 | B2 | 8/2022 | Kohler |
| 11,620,743 | B2 | 4/2023 | Kohler et al. |
| 11,688,169 | B1 | 6/2023 | Dryer et al. |
| 11,763,480 | B2 | 9/2023 | Saniei et al. |
| 11,776,145 | B2 | 10/2023 | Kohler |
| 11,861,509 | B2 | 1/2024 | Neal, Jr. et al. |
| 11,891,098 | B1 | 2/2024 | Smythe et al. |
| 11,932,290 | B2 | 3/2024 | Davis et al. |
| 11,974,035 | B1 | 4/2024 | Buschelman |
| 12,033,312 | B2 | 7/2024 | Kohler et al. |
| 2004/0263624 | A1 | 12/2004 | Nejikovsky et al. |
| 2005/0253926 | A1 | 11/2005 | Chung et al. |
| 2006/0276985 | A1 | 12/2006 | Xu et al. |
| 2007/0040911 | A1 | 2/2007 | Riley |
| 2010/0100275 | A1 | 4/2010 | Mian et al. |
| 2012/0113259 | A1 | 5/2012 | Jie et al. |
| 2013/0054158 | A1 | 2/2013 | Toms |
| 2016/0096536 | A1 | 4/2016 | Toms |
| 2017/0199215 | A1 | 7/2017 | Arcaini et al. |
| 2018/0222498 | A1 | 8/2018 | Kelley |
| 2018/0237041 | A1 | 8/2018 | Mesher |
| 2019/0061791 | A1 | 2/2019 | Yaktine et al. |
| 2019/0094154 | A1 * | 3/2019 | Iler ....................... G01N 21/952 |
| 2019/0260972 | A1 | 8/2019 | Behety |
| 2020/0408682 | A1 | 12/2020 | Mian et al. |
| 2021/0058588 | A1 | 2/2021 | Abreo |
| 2021/0403060 | A1 | 12/2021 | Pertosa |
| 2022/0377251 | A1 | 11/2022 | Grata et al. |
| 2023/0194746 | A1 | 6/2023 | Morton |
| 2023/0410342 | A1 | 12/2023 | Kohler |
| 2023/0410354 | A1 | 12/2023 | Saniei et al. |
| 2024/0004775 | A1 | 1/2024 | Liu |
| 2024/0035931 | A1 | 2/2024 | Grata |
| 2024/0043043 | A1 | 2/2024 | Brooks et al. |
| 2024/0137635 | A1 | 4/2024 | Buschelman |
| 2024/0236464 | A9 | 7/2024 | Buschelman |

FOREIGN PATENT DOCUMENTS

| | | |
|---|---|---|
| CN | 111942434 A | 11/2020 |
| WO | 9532581 A1 | 11/1995 |
| WO | 2022192962 A1 | 9/2022 |
| WO | 2024050200 A1 | 3/2023 |
| WO | 2024050201 A1 | 3/2024 |
| WO | 2024196402 A1 | 9/2024 |

OTHER PUBLICATIONS

Non-Final Office Action For U.S. Appl. No. 18/829,200 dated Oct. 29, 2024, 19 pages.
Chong et al., S.Y. A Review of Health and Operation Monitoring Technologies for Trains, Google Scholar, Smart Structures and Systems, vol. 6, No. 9, 2010, pp. 1079-1105. (Year: 2010).
Gao et al., L. Anomaly Detection of Trackside Equipment Based on GPS and Image Matching, IEEE Access, vol. 6, Jan. 2020, pp. 17346-17355.
Non-Final Office Action for U.S. Appl. No. 18/829,199, mailed Dec. 27, 2024, 12 Pages.
Notice of Allowance for U.S. Appl. No. 18/829,216 dated Dec. 12, 2024, 2 pages.
Qiushi et al., "M. Composite Railway Health Monitoring System based on Fiber Optic Bragg Grating Sensing Array", IEEE Far East Forum on Nondestructive Evaluation/Testing, Jun. 2014, pp. 259-264.

* cited by examiner

INSPECTION PORTAL SYSTEM AND METHODS THERETO

CROSS-REFERENCE TO RELATED APPLICATIONS

This application claims the benefit of, and priority to, U.S. Provisional Patent App. No. 63/581,554, filed on Sep. 8, 2023 and entitled "APPARATUSES, SYSTEMS, AND METHODS FOR MONITORING TRAIN RAILCARS," and U.S. Provisional Patent App. No. 63/582,165, filed on Sep. 12, 2023 and entitled "APPARATUSES, SYSTEMS, AND METHODS FOR MONITORING TRAIN RAILCARS," the disclosures of which are incorporated by reference in their entireties as if the same were fully set forth herein.

TECHNICAL FIELD

This application generally relates to systems and methods for inspecting passing rail-bound vehicles and, more specifically, to various components and systems for gathering data on individual sections of moving rail-bound vehicles.

BACKGROUND

Trains are vital transportation mediums used to distribute a large quantity of goods around the world. Due to their robust nature and efficiency, trains and their sub-components, such as railcars and locomotives, are commonly used repeatedly throughout their lifetime. Repeated and constant use of a particular train or train sub-component can cause the particular train or train sub-component to experience degradation over time. The trains or sub-components are traditionally inspected by individuals at rail yards for any particular issue and to prevent safety and functionality hazards. These inspections can be costly due to the manpower necessary to properly complete the inspections, the amount of time it takes to inspect the trains or train sub-components, and the lost revenue associated with keeping the train or train sub-component in the railyard. Additionally, humans can occasionally miss issues that can lead to safety hazards and/or functional issues with the train or train sub-component.

Therefore, there is a long-felt but unresolved need for a system or method that monitors trains during use, minimizes or otherwise reduces the man-hours necessary for inspecting railcars, identifies a wide variety of issues associated with the railcars, records data associated with the railcars, and/or generates insights associated with the railcars inspected by the disclosed system.

BRIEF SUMMARY OF THE DISCLOSURE

Briefly described, and according to one example, aspects of the present disclosure generally relate to systems and methods for monitoring various aspects of moving railcars in real-time, in near real-time, or in later "offline" or "off-peak" processing. The disclosed system can include an inspection portal system (also referred to herein as a digital train inspection ("DTI") portal). The inspection portal system can include various sensors and computing systems for monitoring railcars, recording data associated with railcars, identifying issues associated with railcars, and generating reports based on the inspected data associated with the railcars. For example, the inspection portal system can include a computing system and a train inspection environment. The train inspection environment can include a portal structure, a weather housing structure, one or more base inspection systems, an undercarriage inspection system, a rail-side inspection system, and/or any other hardware component used to gather data associated with a particular passing and/or passing railcar. Herein, the term "railcar" can refer to any given vehicle or other unit of a train, which can include any given vehicle or other unit configured to travel along a set of train tracks, such as a self-propelled railway vehicle, a vehicle configured to that run along a railway track and transport people or freight (e.g., connected in series with other such vehicles), or locomotive, as non-limiting examples. Throughout this disclosure, reference is made to devices configured to "gather" data, and it is to be understood that this term can include measuring, capturing, or otherwise obtaining data (e.g., the type of data a given sensor or other component or device is configured to gather, measure, capture, or otherwise obtain).

The portal structure can function as a tunnel and/or frame placed around a set of train tracks. The portal structure can be large enough to permit a train and/or railcars to pass therethrough. The sensors can be attached to the portal structure, attached to the tracks (e.g., one or both rails, one or more ties), and/or positioned in or on the ground such that the sensors can substantially and/or completely surround a train as it passes through the inspection portal system. The weather housing can protect the portal structure from the natural environment.

The portal structure can include an overhead portion, a first lateral portion, and a second lateral portion. The first lateral portion and the second lateral portion can be opposite to one another separated by the train track. The overhead portion can extend over the train track and connect both the first lateral portion and the second lateral portion.

The overhead portion can include an overhead inspection system. The overhead inspection system can include lights, cameras, infrared sensors, and/or any other particular sensor for gathering data from a birds-eye perspective.

The first lateral portion and the second lateral portion can include cameras, sensors, and/or lights that are directed toward the train track. For example, the first lateral portion can gather data from a first side of a train track while the second lateral portion can gather data on a second side of the train track. The components (e.g., cameras, sensors, lights) of the first lateral portion, the second lateral portion, and the overhead portion can synchronously gather data on any particular passing railcar. The components of first lateral portion and/or the components of the second lateral portion can be configured to gather data and/or capture images regarding various components and/or regions of railcars, including, but not limited to, couplers, air hoses, trucks, wheels, retainer valves, and/or the full side of the passing railcars.

The base inspection systems can include a first base inspection system on the first side of the train track and a second base inspection system on the second side of the train track. The first base inspection system and the second base inspection system can be opposite to one another separated by the train track. The first base inspection system and the second base inspection system can include cameras, sensors, and lights, each of which is directed toward the train track. The base inspection systems can gather data on the lower portion of the railcar. For example, the base inspection systems can gather data associated with the brake-shoes and/or other lower portion components of the railcar.

The undercarriage inspection system of the train inspection environment can include one or more undercarriage inspection assemblies for gathering data on an undercarriage and/or underside of a passing railcar. A given undercarriage inspection assembly can be or include an undercarriage line-scan inspection assembly and an undercarriage area-scan inspection assembly. The undercarriage line-scan inspection system can include one or more line-scan cameras configured to capture line-scan images of the undercarriage of a particular passing railcar. The undercarriage area-scan camera can include one or more area-scan cameras configured to capture area-scan images of the undercarriage of the particular passing railcar. Regardless of type, each undercarriage inspection assembly can include one or more lights for illuminating the undercarriage of the particular passing railcar for data acquisition.

The rail-side inspection system can include a first rail-side inspection assembly on the first side of the train track and a second rail-side inspection assembly on the second side of the train track. The rail-side inspection assembly can include one or more cameras and/or lights directed towards the train track and used to gather data associated with a cross-key of the passing railcar. The rail-side inspection assembly can be installed on the ground adjacent to the train track or on one or more rail ties at a location outside of the rails. Regardless, the rail-side inspection assembly can be angled in a direction that is upward and toward the rails, which can position to the rail-side inspection assembly to capture images of railcar components that are otherwise difficult or impossible to view from other angles (e.g., while the railcar is in motion), such as the cross-key of a passing railcar, as a non-limiting example.

The various sensors of the train inspection environment can record data associated with the railcars. For example, the various sensors can include one or more cameras for recording images of the railcars. In another example, the various sensors can include one or more infrared sensors for recording infrared images of the railcars or parts thereof. The train inspection environment can include one or more lights for illuminating areas of the railcar for inspection. The train inspection environment can include any particular sensor, camera, and/or lighting system necessary for recording data associated with the railcars.

The components of the train inspection environment can be modular such that cameras, sensors, and/or lights can be removed, repaired, upgraded, and/or replaced depending on the current needs and/or uses of the inspection portal system. For example, the cameras of the inspection portal system can be moved based on the type of train passing through the inspection portal system. In another example, the sensors can be upgraded to include upgraded sensors capable of gathering new types of data. The train inspection environment can include motorized mechanisms connected to each particular sensor. The motorized mechanisms can change the positioning and/or location of the sensors to accommodate any particular data acquisition requirements.

The train inspection environment can include modular and configurable camera controls, infrared imaging systems, train speed estimation systems, railcar identification systems, and real-time health monitoring systems.

The train inspection environment can include modular and configurable camera controls. For example, various distinct types of cameras can be added and/or mixed into the train inspection environment. The computing system of the inspection portal system can configure and/or control the capture rate and/or capture timing of each individual camera. For example, the computing system can vary the capture rate and/or capture timing of each camera such that the components of the train inspection environment can compensate for any differences in latency among different makes and/or models of the cameras. The computing system of the inspection portal system can, for example, synchronize the capture timing of cameras to within a microsecond of latency, such that all photos can be taken at the same time (i.e., within a microsecond).

The inspection portal system can include infrared (IR) cameras to help detect issues or potential issues, such as those that are not yet visible in the optical spectrum. Based on the obtained IR images, the inspection portal system can determine various heat profiles, indicating where and to what extent a wheel or other component is experiencing a temperature change. For example, a certain heating profile can be indicative of an applied hand brake scenario in which the hand brake was left engaged while the train was moving.

According to a first aspect, an inspection portal system comprising: A) a support structure comprising a first side, a second side, and a top side supported by the first and second sides, the support structure configured to span across a railroad track and to permit a train to pass therethrough; B) an overhead inspection system attached to the top side, the overhead inspection system comprising one or more overhead cameras comprising an overhead line scan camera and an overhead area scan camera, and one or more overhead lights; C) a first side inspection system attached to the first side of the support structure, the first side inspection system comprising one or more first cameras and one or more first lights and configured to capture images of a first side of a railcar; D) a second side inspection system attached to the second side of the support structure, the second side inspection system comprising one or more second cameras and one or more second lights and configured to capture images of a first side of a railcar; E) an undercarriage inspection system comprising one or more undercarriage inspection assemblies, each of the one or more undercarriage inspection assemblies being located between the rails of a railway and comprising one or more undercarriage cameras and one or more undercarriage lights; and F) one or more tie-mounted inspection assemblies, each of the one or more tie-mounted inspection assemblies being attached to one or more ties of a railway at a location outside the rails of the railway, and comprising one or more third cameras and one or more third lights.

According to a further aspect, the inspection portal system of the first aspect or any other aspect, further comprising a weather housing comprising a first wall, a second wall, a roof, a first open end, and a second open end, wherein the weather housing covers the support structure, and is configured to permit a train to pass therethrough via the first open end and the second open end.

According to a further aspect, the inspection portal system of the first aspect or any other aspect, wherein at least one of the one or more first cameras, the one or more second cameras, the one or more undercarriage cameras, or the one or more third cameras is a line scan camera.

According to a further aspect, the inspection portal system of the first aspect or any other aspect, wherein at least one of the one or more first cameras, the one or more second cameras, the one or more undercarriage cameras, or the one or more third cameras is an area scan camera.

According to a further aspect, the inspection portal system of the first aspect or any other aspect, further comprising: A) a second support structure comprising a third side inspection system configured to capture images of a region of the first side of the railcar, the third side inspection system comprising one or more fourth cameras and one or more fourth lights; and B) a third support structure comprising a fourth side inspection system configured to capture images of a region of the second side of the railcar, the fourth side inspection system comprising one or more fifth cameras and one or more fifth lights.

According to a further aspect, the inspection portal system of the first aspect or any other aspect, wherein the third side inspection system is configured to capture images of a brake and/or shoe region of the first side of the railcar and the fourth side inspection system is configured to capture images of a brake and/or shoe region of the second side of the railcar.

According to a further aspect, the inspection portal system of the first aspect or any other aspect, further comprising one or more wheel detection sensors configured to detect a presence or a non-presence of a railcar wheel at a location along the railway that is upstream from the support structure.

According to a further aspect, the inspection portal system of the first aspect or any other aspect, further comprising one or more computing devices in electrical communication with: A) the one or more wheel detection sensors; B) inspection portal cameras comprising the one or more overhead cameras, the one or more first cameras, the one or more second cameras, the one or more undercarriage cameras, and the one or more third cameras; and C) inspection portal lights comprising the one or more overhead lights, the one or more first lights, the one or more second lights, the one or more undercarriage lights, and the one or more third lights, wherein the one or more computing devices is configured to determine a capture timing for each of the inspection portal cameras based at least in part on a train speed estimation determined according to wheel detection events detected by the wheel detection sensors.

According to a further aspect, the inspection portal system of the first aspect or any other aspect, wherein the one or more computing devices is further configured to determine the capture timing for each of the inspection portal cameras based on a physical distance between the wheel detection sensors and each corresponding one of the inspection portal cameras.

According to a further aspect, the inspection portal system of the first aspect or any other aspect, wherein the one or more computing devices is further configured to determine the capture timing for each of the inspection portal cameras based on one or more electrical signal transmission or processing latencies.

According to a further aspect, the inspection portal system of the first aspect or any other aspect, the one or more wheel detection sensors comprises one or more pressure switches attached to the railway.

According to a further aspect, the inspection portal system of the first aspect or any other aspect, wherein the one or more wheel detection sensors comprises one or more light curtains.

According to a further aspect, the inspection portal system of the first aspect or any other aspect, wherein the one or more wheel detection sensors comprises one or more microphones, the one or more computing devices being configured to recognize one or more sounds indicative of train wheels passing by the one or more microphones.

According to a further aspect, the inspection portal system of the first aspect or any other aspect, wherein the one or more overhead cameras, the one or more first cameras, the one or more second cameras, the one or more undercarriage cameras, and the one or more third cameras are each located in a respective weather-resistant housing.

According to a further aspect, the inspection portal system of the first aspect or any other aspect, further comprising a compressed air source, wherein at least one of the one or more undercarriage inspection assemblies or the one or more tie-mounted inspection assemblies comprises an air curtain configured to blow air across an optical end of the one or more undercarriage cameras or the one or more third cameras.

According to a further aspect, the inspection portal system of the first aspect or any other aspect, wherein at least some of the one or more first lights form a first array of first lights and at least some of the one or more second lights form a second array of second lights.

According to a further aspect, the inspection portal system of the first aspect or any other aspect, wherein: A) at least some of the one or more first lights form a first array of first lights and a second array of first lights, the first array of first lights being arranged in a generally vertical orientation along at least a first portion of the first side of the support structure, and the second array of first lights being arranged in a generally vertical orientation along at least a second portion of the first side of the support structure; and B) at least some of the one or more second lights form a first array of second lights and a second array of second lights, the first array of second lights being arranged in a generally vertical orientation along at least a first portion of the second side of the support structure, and the second array of second lights being arranged in a generally vertical orientation along at least a second portion of the second side of the support structure.

According to a further aspect, the inspection portal system of the first aspect or any other aspect, wherein: A) at least some of the first lights of the first array of first lights are pointed in a direction that is different from a direction in which some others of the first lights of the first array of first lights are pointed; B) at least some of the first lights of the second array of first lights are pointed in a direction that is different from a direction in which some others of the first lights of the second array of first lights are pointed; C) at least some of the second lights of the first array of second lights are pointed in a direction that is different from a direction in which some others of the second lights of the first array of second lights are pointed; and D) at least some of the second lights of the second array of second lights are pointed in a direction that is different from a direction in which some others of the second lights of the second array of second lights are pointed.

According to a further aspect, the inspection portal system of the first aspect or any other aspect, wherein: A) there is a first gap between the first array of first lights and the second array of first lights; B) at least some of the one or more first cameras are positioned within the first gap; C) there is a second gap between the first array of second lights and the second array of second lights; and D) at least some of the one or more second cameras are positioned within the second gap.

According to a further aspect, the inspection portal system of the first aspect or any other aspect, wherein at least some of the one or more overhead cameras, the one or more first cameras, the one or more second cameras, the one or more undercarriage cameras, or the one or more third cameras are positioned, angled, and focused to capture images of one or more respective particular components of a passing railcar.

According to a further aspect, the inspection portal system of the first aspect or any other aspect, wherein at least some of the one or more overhead cameras, the one or more first cameras, the one or more second cameras, the one or more undercarriage cameras, or the one or more third cameras are positioned, angled, and focused to capture images of one or more respective particular regions of a passing railcar.

These and other aspects, features, and benefits of the claimed innovation(s) will become apparent from the following detailed written description of the preferred examples and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more examples and/or aspects of the disclosure and, together with the written description, serve to explain the principles of the disclosure. Wherever possible, the same reference numbers are used throughout the drawings to refer to the same or like elements of the disclosed systems and processes, and wherein.

DETAILED DESCRIPTION

Figure 1:
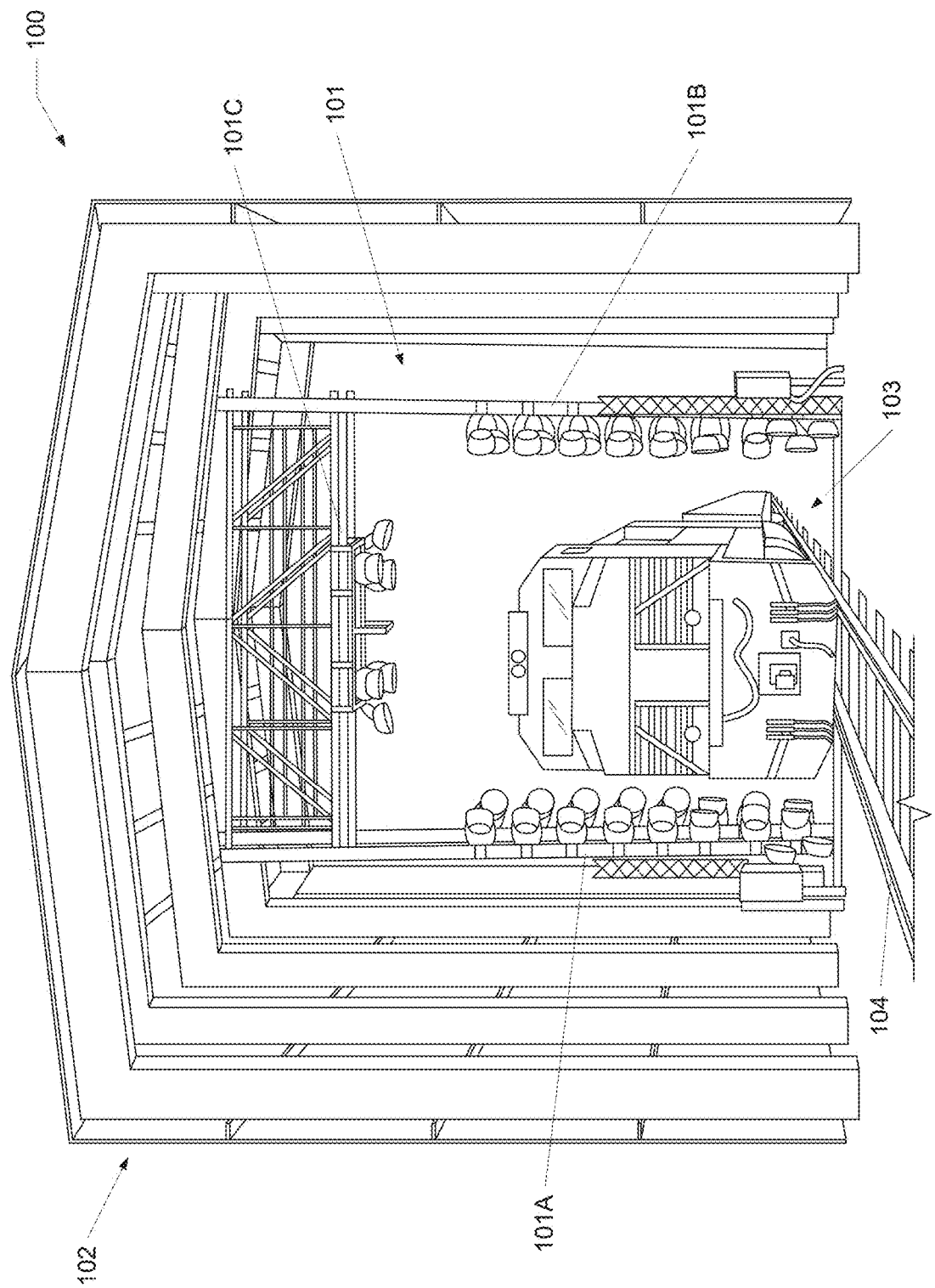
FIG. 1 illustrates a train inspection environment, in accordance with the disclosed technology.

The disclosed technology relates generally to systems and methods for inspecting passing rail-bound vehicles and, more specifically, to various components and systems for gathering data on individual sections of moving rail-bound vehicles. Some examples of the disclosed technology will be described more fully with reference to the accompanying drawings. However, this disclosed technology may be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range of formats (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to and are not intended to imply that the objects so described should be in a given sequence, either temporally, spatially, in ranking, or in any other manner.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the illustrative examples provided in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Example Embodiments

Referring now to the figures, for the purposes of example and explanation of the fundamental processes and components of the disclosed apparatuses, systems, and methods, reference is made to FIG. 1, which illustrates a train inspection environment 100, according to one or more examples. As will be understood and appreciated, the train inspection environment 100 shown in FIG. 1 represents merely one approach or example of the present system, and other aspects are used according to various examples of the present system.

The train inspection environment 100 can function as a data acquisition system for monitoring the health of a passing railcar 103. The train inspection environment 100 can include a portal structure 101, a weather housing 102, base inspection systems 202A-202B (see FIG. 2 for further details), undercarriage inspection assemblies (see FIG. 3 for further details), and a rail-side inspection assembly 303 (see FIG. 3 for further details). The train inspection environment 100 can include any particular hardware component capable of gathering data associated with the passing railcar 103. Though discussed in the context of railcars 103, the train inspection environment 100 can be applied to any particular moving vehicle. For example, the train inspection environment 100 (or aspects thereof) can be used to inspect and/or monitor cars, trucks, boats, aircraft, and/or any other moving vehicle. As more specific non-limiting examples, the train inspection environment 100 can be installed in, on, or near an air hanger to monitor airplanes, a weigh station to monitor trucks, a roadway to monitor cars, and/or a waterway to monitor passing boats.

Alternatively or in addition, the train inspection environment 100 can inspect and/or monitor various specific components of the passing railcar 103. The train inspection environment 100 can inspect and/or monitor the trucks of the passing railcar 103, the brake system of the passing railcar 103, the coupler of the passing railcar 103, the cross-key component of the passing railcar 103, the wheel retainer valves of the passing railcar 103, the air hoses of the passing railcar 103, and/or any other particular component or region of the passing railcar 103. The train inspection environment 100 can include one or more individual inspection assemblies or systems configured to gather images and/or other data regarding specific components or regions of the passing railcar 103. For example, the rail-side inspection assembly 303 can be configured to gather data and/or capture images of the cross-key component of the passing railcar 103. Alternatively or in addition, the base inspection systems 202A-202B can be configured to gather data and/or capture images of the brake-wheel, the trucks, and/or any other component of the lower portion (e.g., lower half) of the passing railcar 103.

The portal structure 101 can function as a tunnel and/or frame placed around the train tracks 104. The portal structure 101 can be large enough such that the passing railcar 103 can pass through the portal structure 101. The portal structure 101 can include cameras, lights, and/or sensors (e.g., light sensors, microphones, heat sensors, motion sensors, etc.) attached directly to the portal structure 101 and/or on the ground near the portal structure 101. The cameras, lights, and/or sensors of the portal structure 101 can completely surround the passing railcar 103 as it passes through the portal structure 101. For example, as the passing railcar 103 progresses along a train track 104, the railcar 103 can pass under and/or through the portal structure 101. As the railcar 103 passes through the portal structure 101, the various cameras, sensors, and/or lights can trigger and gather data associated with the railcar 103. The portal structure 101, the base inspection systems 202A-202B, the undercarriage inspection assemblies 301, 302, and the rail-side inspection assembly 303 can each gather data on distinct portions of the railcar 103. For example, as the railcar 103 passes through the portal structure 101, a first lateral portion 101A and a second lateral portion 101B of the portal structure 101 can include cameras, sensors, and/or lights, to capture data from each lateral side of the railcar 103. Continuing this example, an overhead portion 101C of the portal structure 101 can include cameras, sensors, and/or lights to capture birds-eye data of the top portion of the passing railcar 103. The undercarriage inspection assemblies can gather data of the undercarriage of the passing railcar 103. The rail-side inspection assembly 303 can gather data on the cross-key components of the passing railcar 103.

The train inspection environment 100 can gather data as the passing railcar 103 travels at a high rate of velocity. In a non-limiting example, the passing railcar 103 can move at a velocity of 70 miles per hour, and as the passing railcar 103 travels through the portal structure 101 at 70 miles per hour, the various sensors, cameras, and/or lights of the portal structure 101 can capture data at high rates to accommodate for the speed of the passing railcar 103. For example, the sensors, cameras, and/or lights of the portal structure 101 can gather data in intervals of less than 2 milliseconds.

The weather housing 102 can completely cover the portal structure 101. The weather housing 102 can provide a relatively constant environment for the portal structure 101 to gather data on the passing railcar 103. For example, the weather housing 102 can reduce the amount of wind present in the portal structure 101. In another example, the weather housing 102 can protect the portal structure from debris, rain, strong winds, and other natural hazards. The weather housing 102 can also mitigate the effects of variations in the amount of ambient light and direction or concentration of external light sources, such as the sun, and any shadows or image artifacts that can be caused therefrom, from interfering with the data collection of the sensors and cameras 221. The weather housing 102 can include two walls that straddle the portal structure 101, two openings to allow the passing railcar 103 to move through the weather housing 102, and a roof to cover the portal structure.

Figure 2:
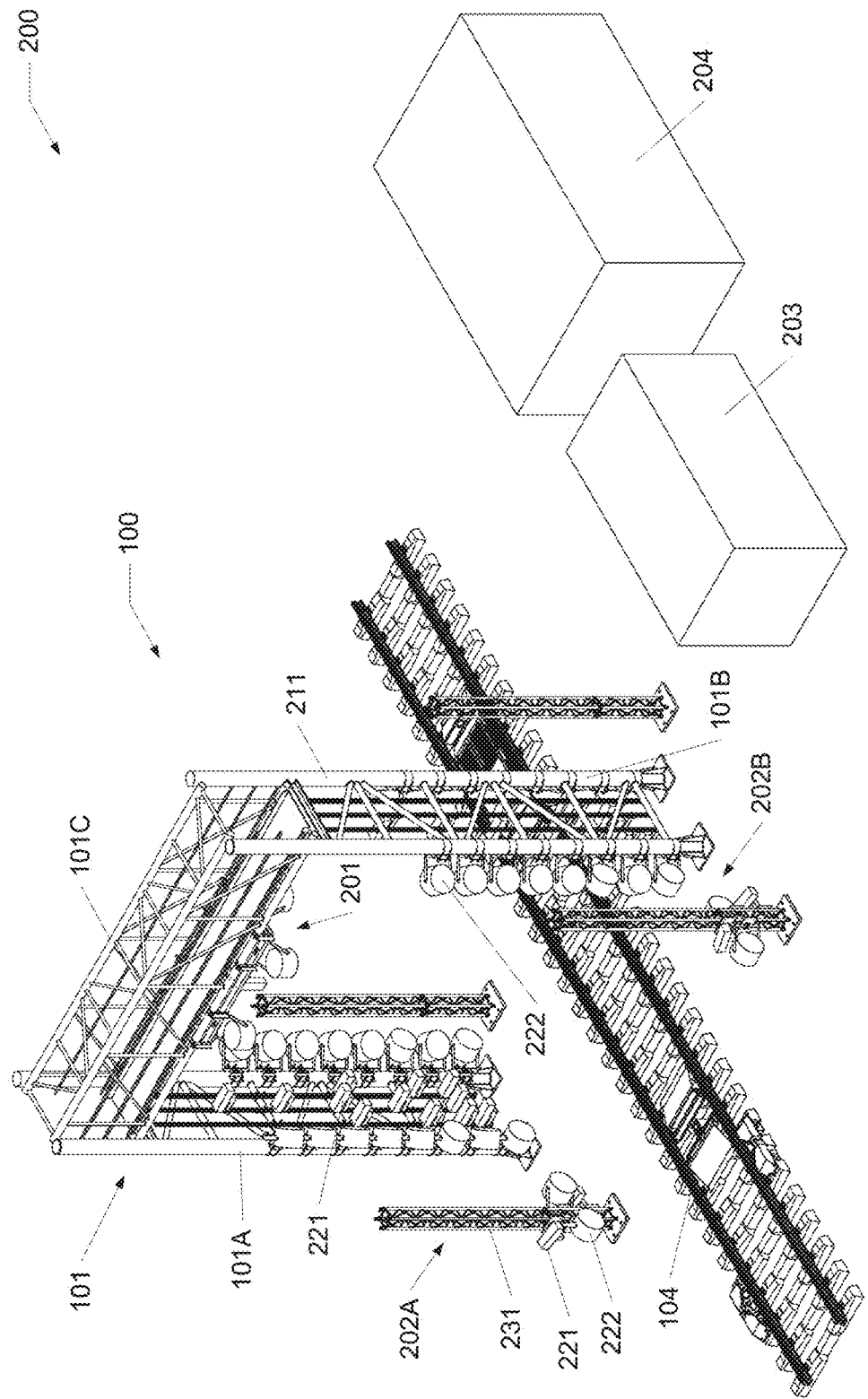
FIG. 2 illustrates an example perspective view of an inspection portal system, in accordance with the disclosed technology.

Referring now to FIG. 2, illustrated is an example perspective view of an inspection portal system 200, in accordance with the disclosed technology. The inspection portal system 200 can include a computing environment 203, the train inspection environment 100 (the weather housing 102 is not shown for purposes of illustrating the portal structure 101 unobstructed and in full view), and a service shed 204. The inspection portal system 200 can include the totality of components used to gather data associated with the passing railcar 103, monitor the data, and determine the health of the passing railcar 103. The inspection portal system 200 can include various sensors and computing systems for monitoring railcars 103, recording data associated with railcars 103, identifying issues associated with railcars 103, and generating reports based on the inspected data associated with the railcars 103.

Figure 3:
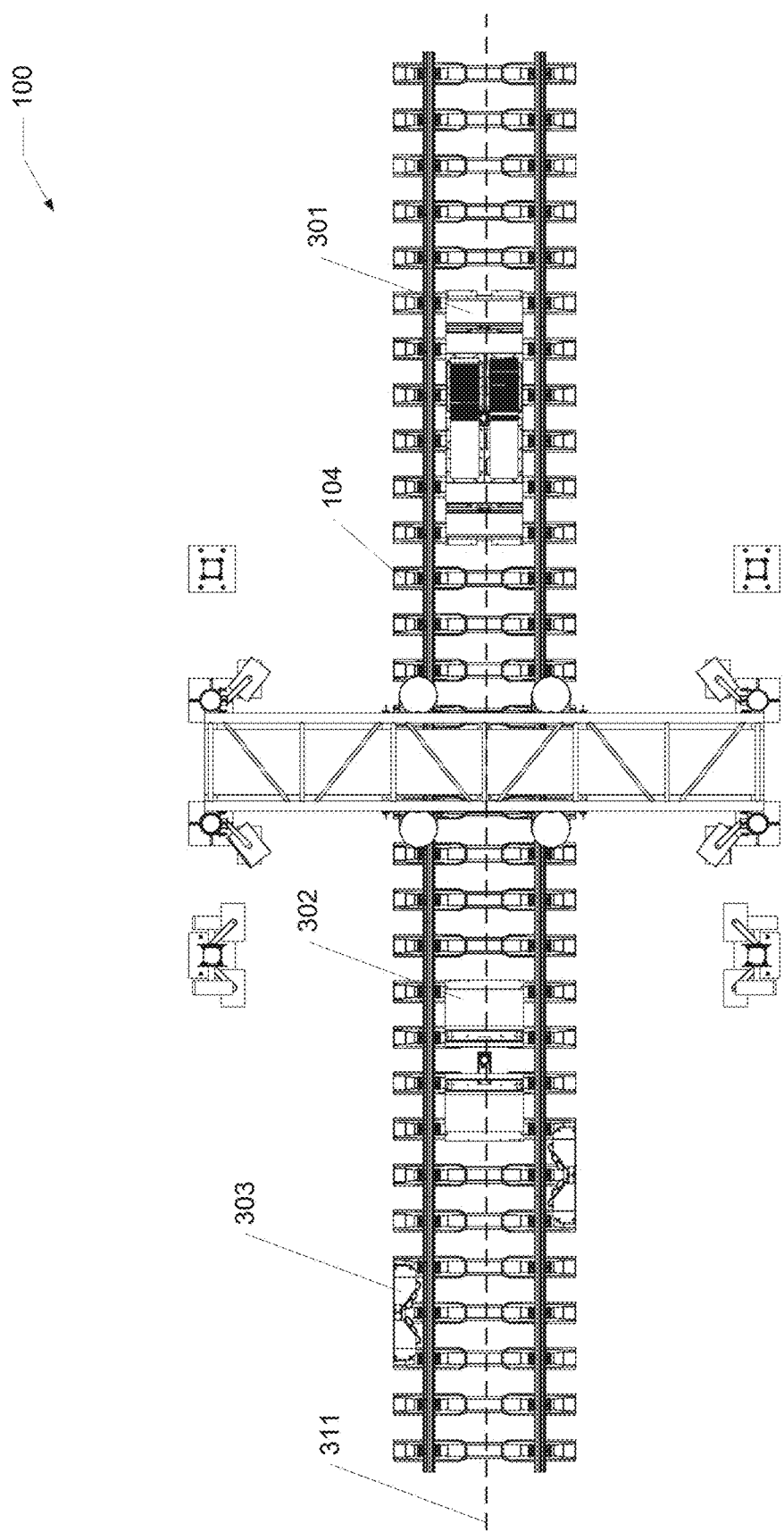
FIG. 3 illustrates an example top view of a train inspection environment, in accordance with the disclosed technology.

The train inspection environment 100 can include the portal structure 101, one or more base inspection systems 202A-202B, one or more undercarriage inspection assemblies 301, 302, and one or more rail-side inspection assemblies 303 (See FIG. 3 for further details).

The portal structure 101 can include the first lateral structure 101A, the second lateral structure 101B, and the overhead portion 101C. The first lateral structure 101A can be located on a first side of the train track 104. The second lateral structure 101B can be located on a second side of the train track 104. The first lateral structure 101A and the second lateral structure 101B can be substantially similar. The first lateral structure 101A and the second lateral structure 101B can include one or more cameras 221 and one or more lights 222. Each camera 221 can be or include any imaging device, such as a visual-spectrum camera, an infrared camera, a light detection and ranging (LIDAR) system (e.g., each with one or more corresponding emitters or lasers and one or more receivers), and/or any other particular sensor configured to capture, gather, or otherwise obtain data about the passing railcar 103. The first lateral structure 101A and the second lateral structure 101B can be configured to gather data and/or capture images of the lateral sides of the passing railcar 103. For example, the first lateral structure 101A and the second lateral structure 101B can capture images of the couplers, trucks, wheel retainer valves, and/or any other component located on the passing railcar 103.

The lights 222 can include any particular lighting system used to illuminate the railcar 103 as it passes through the portal structure 101. In a non-limiting example, the lights 222 can include 14,000 lumen light emitting diode (LED) lights. The lights 222 can include stadium-grade lights, high-powered lights, and/or any particular light that can generate a sufficient amount of light (e.g., 10,000 lumens or more, 14,000 lumens or more). The cameras 221 and the lights 222 of the first lateral structure 101A and the second lateral structure 101B can face (e.g., be positioned in the general direction of) the train track 104. The cameras 221 of the first lateral structure 101A can be configured to gather data (e.g., capture images) on a first side of the railcar 103 and the cameras 221 of the second lateral structure 101A can be configured to gather data on a second side of the railcar 103. One, some, or all of the cameras 221 and/or lights 222 of the portal structure 101 can be directed to a specific three-dimensional space. Stated differently, one, some, or all cameras 221 of the portal structure 101 and/or one some, or all lights 222 of the portal structure 101 can be targeted at a corresponding specific point or area such that the corresponding camera 221 and/or light 222 are focused on one or more specific components, elements, and/or portions of a passing railcar 103.

The portal structure 101 can include or be in communication with one or more radio frequency identification (RFID) sensors, which can be configured to read railcar identification information from an RFID tag attached to each railcar 103, and the railcar identification information can be used to organize captured images to ensure the captured images are associated with the correct railcar.

The first lateral structure 101A and the second lateral structure 101B can be connected by an overhead portion 101C. The overhead portion 101C can include an overhead inspection system 201. The overhead inspection system 201 can include one or more cameras 221 and one or more lights 222 for gathering data on the top portion of the passing railcar 103. For example, the overhead inspection system 201 can gather images and other data from an overhead perspective, or bird's-eye view, of the railcar 103. The overhead inspection system 201 can include one or more line-scan cameras and/or one or more area-scan cameras. For example, the overhead inspection system 201 can include two cameras, where one camera is a line-scan camera and the other camera is an area-scan camera. The line-scan camera(s) and the area-scan camera(s) of the overhead inspection system 201 can be configured to gather images of the entire width of a passing railcar 103. Each camera and each light of the overhead inspection system 201 can be directed to a specific three-dimensional space. Stated differently, each camera and each light of the overhead inspection system 201 can be targeted at a specific point such that the corresponding camera and/or light are focused on one or more specific components, elements, and/or portions of a passing railcar 103.

Various elements of the portal structure 101 (e.g., the first lateral structure 101A, the second lateral structure 101B, the overhead portion 101C) can include a frame 211. The frame 211 can be or include a truss structure, which can support the various components installed on the first lateral structure 101A, the second lateral structure 101B, and the overhead portion 101C. A given frame 211 can include modular attachment points. The modular attachment points can facilitate the removal, upgrade, and/or replacement of the cameras 221 and/or the lights 222.

The train inspection environment 100 can include the base inspection systems 202A, 202B. The base inspection systems 202A, 202B can gather data (e.g., images) on a lower portion of the passing railcar 103. For example, the base inspection systems 202A, 202B can gather data on the brake-shoes of the passing railcar 103. The base inspection systems 202A, 202B can include one or more cameras 221 and one or more lights 222. Each camera 221 and each light 222 can be directed to a specific three-dimensional space. Stated differently, each camera 221 and/or each light 222 can be targeted at a specific point such that the corresponding camera 221 and/or light 222 are focused on one or more specific components, elements, and/or portions of a passing railcar 103. The base inspection systems 202A, 202B can be located adjacent to the portal structure 101. The base inspection systems 202A, 202B can include a first base inspection system 202A and a second base inspection system 202B.

The first base inspection system 202A can be located on the first side of the train track 104, and the second base inspection system 202B can be located on the second side of the train track 104. The cameras 221 and the lights 222 of the base inspection systems 202A, 202B can face the train track 104. The cameras 221 of the first base inspection system 202A can gather data on the first side of the railcar 103. The cameras 221 of the second base inspection system 202B can gather data on the second side of the railcar 103. The base inspection systems 202A, 202B can each include a truss beam 231. The truss beam 231 can function as the attachment point for the cameras 221 and the lights 222. The truss beam 231 can be secured to the ground adjacent to the train track 104 and the portal structure 101.

Each of the components of the train inspection environment 100 can include a modular configuration such that the cameras 221, lights 222, and/or sensors can be moved, replaced, and/or upgraded. For example, the cameras 221 of the portal structure 101 can be moved based on the type of railcar 103 passing through the train inspection environment 100. Alternatively or in addition, the modular configuration can enable easy exchange and/or replacement of the cameras 221. For example, one or more cameras 221 can be upgraded to include upgraded cameras capable of gathering clearer, more accurate, and/or new types of data. The train inspection environment 100 can include motorized mechanisms connected to each particular camera 221 and/or light 222. The motorized mechanisms can change the positioning and/or location of the cameras 221 and/or lights 222 to accommodate any particular data acquisition requirements. The motorized mechanisms can also change various physical configurations of the lens attached to or contained within the cameras 221, such as changing the focus, aperture, or polarization direction, and/or filter of the lens. As a more particular and non-limiting example, the cameras 221 can be automatically moved or refocused based at least in part on the type of railcar 103 passing through the train inspection environment 100 (and/or the type/location of the component being targeted by the cameras 221).

The computing environment 203 can function as the central computing infrastructure of the inspection portal system 200. The computing environment 203 can include one or more computing devices configured to manage the various computational requirements of the computing environment 203. The computing environment 203 can manage the sensors, cameras, and/or lights of the train inspection environment 100 for data acquisition, storage, distribution, and processing, generate reports associated with the particular passing railcar 103, and/or perform any specific computational requirement of the inspection portal system 200. The computing environment 203, though illustrated as located near the train inspection environment 100, can be in any particular location (e.g., remote, local, etc.). In a particular non-limiting example, the computing environment 203 can include a server (e.g., remote or off-site), which can manage the computing requirements of the computing environment 203 (e.g., controlling the cameras 221, lights 222, and/or other components of the inspection portal system 200; receiving, organizing, and/or storing captured images and other data).

The inspection portal system 200 can include the service shed 204. The service shed 204 can store miscellaneous components of the inspection portal system 200. For example, the service shed 204 can include one or more compressed air sources configured to generate compressed air for use by the inspection portal system 200, such as by one or more air curtains, which can protect and/or clean cameras 221, lights 222, or other components of a given assembly or system (e.g., undercarriage inspection assemblies 301, 302; rail-side inspection assemblies 303). For example, each of the cameras of the inspection portal 101, the undercarriage inspection assemblies 301, 302, the base inspection systems 202A, 202B, and/or the rail-side inspection assemblies can include the air curtains that can blow air over the lenses of the cameras 221 and protect the lenses from debris.

The inspection portal system 200 can include a railcar detection system (not pictured). The railcar detection system (also referred to herein as wheel detection sensors) can include one or more sensors in electrical communication with the computing environment 203 and installed on the train track 104 to identify the presence of a passing railcar 103. The railcar detection system can include one or more pressure switches to identify the pressure applied by the wheels of a passing railcar 103, or other sensors such as inductance-based sensors, metal detection sensors, or proximity sensors, some of which may not require the physical contact or interaction of the railcar 103 or wheels thereof to detect a passing wheel.

The railcar detection system (e.g., the computing environment 203) can calculate the speed of the passing railcar 103, as well as the existence of each axle of the passing railcar 103 and the trajectory of each axle as it passes through the inspection portal system 200, based at least in part on data received from the sensor(s) of the railcar detection system. Based on the determined speed of the passing railcar 103, and the trajectory of railcar axles, the computing environment 203 can trigger the various cameras 221 of the inspection portal system 200 to capture images of the passing railcar 103 according to one or more determined timings (e.g., based on the determined speed of the train or trajectory of the axles), can turn on the various lights 222 according to one or more determined timings (e.g., based on the determined speed of the train or trajectory of the axles), and/or can operate any other devices according to one or more determined timings (e.g., based on the determined speed of the train or trajectory of the axles), such as air curtains, as one non-limiting example. Alternatively or in addition, the computing environment 203 can use the determined speed of the passing railcar 103, the different makes and models of the various cameras of the inspection portal system 200 (e.g., known processing latencies, such as the known image capturing speeds (or delays) of the various cameras of the inspection portal system 200), and/or any other pertinent information to properly synchronize the cameras to gather accurate images of the passing railcar 103. The computing environment 203 can determine a capture timing for triggering the cameras 221 based on a known distance between the railcar detection system sensors and the cameras 221 and the calculated speed of the passing railcar 103.

Referring now to FIG. 3, illustrated is an example top view of the train inspection environment 100, in accordance with the disclosed technology. The train inspection environment 100 can be symmetrical about a central axis 311. For example, the train inspection environment 100 can include an equal number of inspection systems or assemblies on either side of the central axis 311 such that the totality of the railcar 103 is analyzed during data capture procedures. Alternatively, one side of the train inspection environment 100 can include a first number of inspection systems or assemblies on a first side of the axis 311 and a second, different number of inspection systems or assemblies on the second side of the axis (e.g., to capture images of one or more given components or portions of a given railcar).

The train inspection environment 100 can include the undercarriage inspection assemblies and the rail-side inspection assembly 303. The undercarriage inspection assemblies 301, 302 can include one or more undercarriage area-scan inspection assemblies 301 and one or more undercarriage line-scan inspection assemblies 302. The undercarriage area-scan inspection system 301 and the undercarriage line-scan inspection system 302 can each gather data and/or images of the undercarriage of the passing railcar 103. For example, the undercarriage area-scan inspection system 301 can include one or more area-scan cameras for gathering data on a particular area of the undercarriage of the passing railcar 103. Alternative or in addition, the undercarriage line-scan inspection system 302 can include one or more line-scan cameras for gathering data on a particular area of the undercarriage of the passing railcar 103. Both the undercarriage area-scan inspection system 301 and the undercarriage line-scan inspection system 302 can be located between the rails of the train tracks 104 (e.g., centered between the train tracks 104). For example, the central axis 311 can symmetrically bisect both the undercarriage area-scan inspection system 301 and the undercarriage line-scan inspection system 302. One or more cameras 221 of the undercarriage inspection assemblies 301, 302 can be oriented in a completely vertical direction (e.g., the sensor of the camera 221 can be oriented to capture images from a space immediately above the sensor). Alternatively or in addition, one or more cameras 221 of the undercarriage inspection assemblies 301, 302 can be oriented in a direction that is partially in the vertical direction and partially in a horizontal direction, such that the camera(s) 221 can capture images from an uprail location or a downrail location. Alternatively or in addition, one or more cameras 221 of the undercarriage inspection assemblies 301, 302 can be oriented in a direction that is partially in the vertical direction and partially in a lateral direction, such that the camera(s) 221 can capture images from a direction that is toward a given side of the train tracks 104 from the location of the corresponding camera(s) 221.

The train inspection environment 100 can include the rail-side inspection assembly 303. The rail-side inspection assembly 303 can include two or more individual systems that can attach to one or more rail ties at a location outside of the rails of the train track 104. The individual systems of the rail-side inspection assembly 303 can face the central axis 311 of the train track 104. The rail-side inspection assembly 303 can gather data on various lower components of the railcar 103. For example, the rail-side inspection assembly 303 can gather data on the cross-keys of the railcar 103. The rail-side inspection assembly 303 can include an array of line-scan and/or area-scan cameras, which can gather data on the various lower components of the railcar 103. One or more cameras 221 of the rail-side inspection assembly 303 can be oriented in a direction that is partially in the vertical direction and partially in a horizontal direction, such that the camera(s) 221 can capture images of a lower portion of the railcar 103. For example, the rail-side inspection assembly 303 can be oriented in a direction that is partially in the vertical direction and partially in a horizontal direction, such that the camera(s) 221 can capture images of the cross-key component of the railcar 103.

Figure 4:
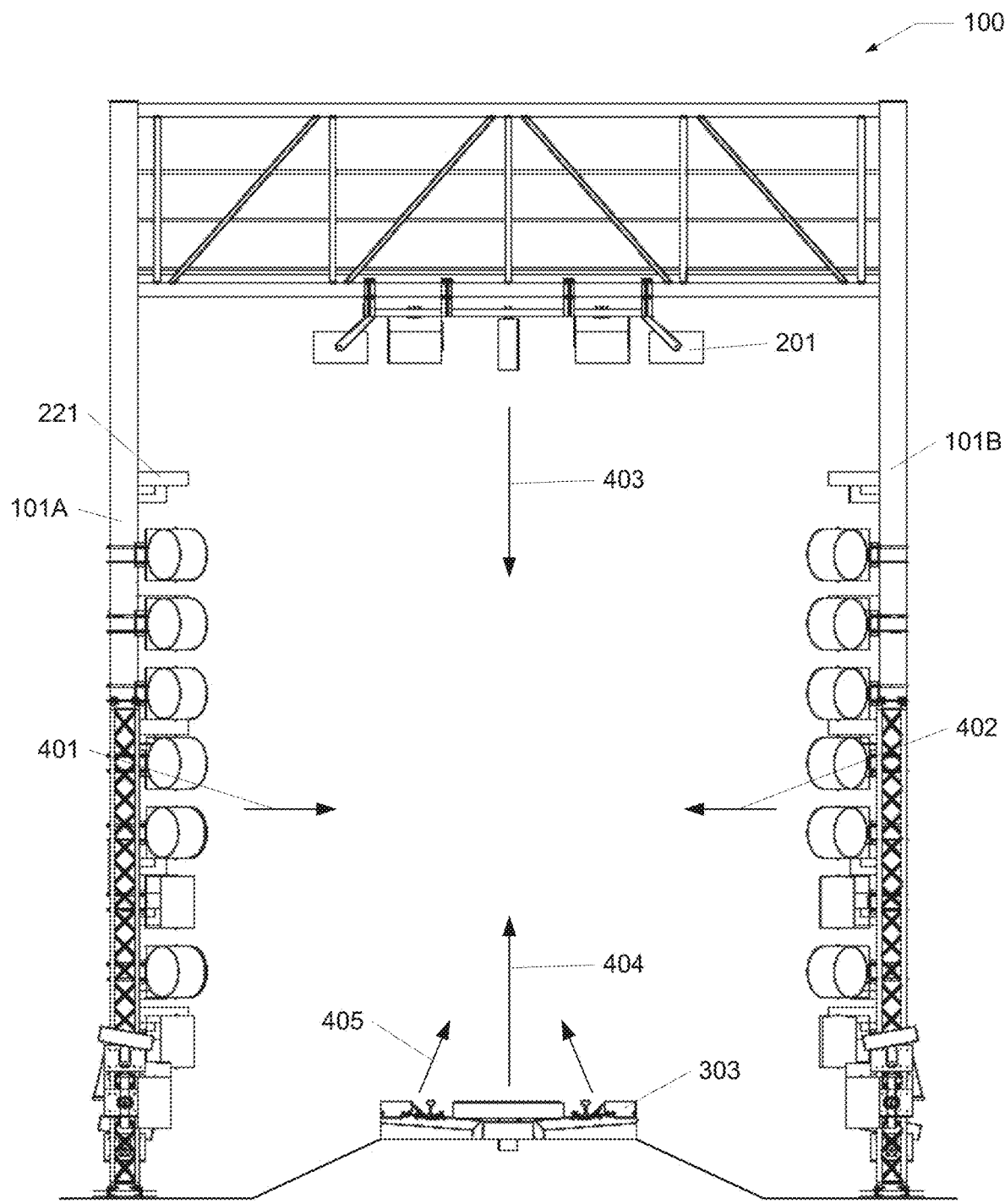
FIG. 4 illustrates an example front view of a train inspection environment, in accordance with the disclosed technology.

Referring now to FIG. 4, illustrated is an example side view of the train inspection environment 100, in accordance with the disclosed technology. The train inspection environment 100 can gather data in a variety of directions including a first direction 401, a second direction 402, a downward direction 403, an upward direction 404, and an angled direction 405, as non-limiting examples. The various directions can have a vertical direction component (e.g., up or down, as illustrated in FIG. 4, a downrail or uprail directional component (e.g., in or out of the page, as illustrated in FIG. 4), and/or a lateral directional component (e.g., left or right, as illustrated in FIG. 4). The cameras 221 of the first lateral portion 101A can gather data from the passing railcar 103 in the first direction 401. The cameras 221 of the second lateral portion 101B can gather data from the passing railcar 103 in the second direction 402. For example, one or more cameras 221 can be configured to capture images of the entire height of the railcar 103. Alternatively or in addition, a given camera 221 can be configured to capture images of only a specific region of the railcar 103, (e.g., a region in which one or more specific components are located). The cameras 221 of the overhead inspection system 201 can gather data on the passing railcar 103 in the downward direction 403. The undercarriage inspection assemblies can gather data from the passing railcar 103 in the upward direction 404. The rail-side inspection assembly 303 can gather data in the angled direction 405. By gathering data in the first direction 401, the second direction 402, the downward direction 403, the upward direction 404, and the angled direction 405, the train inspection environment 100 can gather data on the complete railcar 103 and identify any defects of the railcar 103.

Figure 5A:
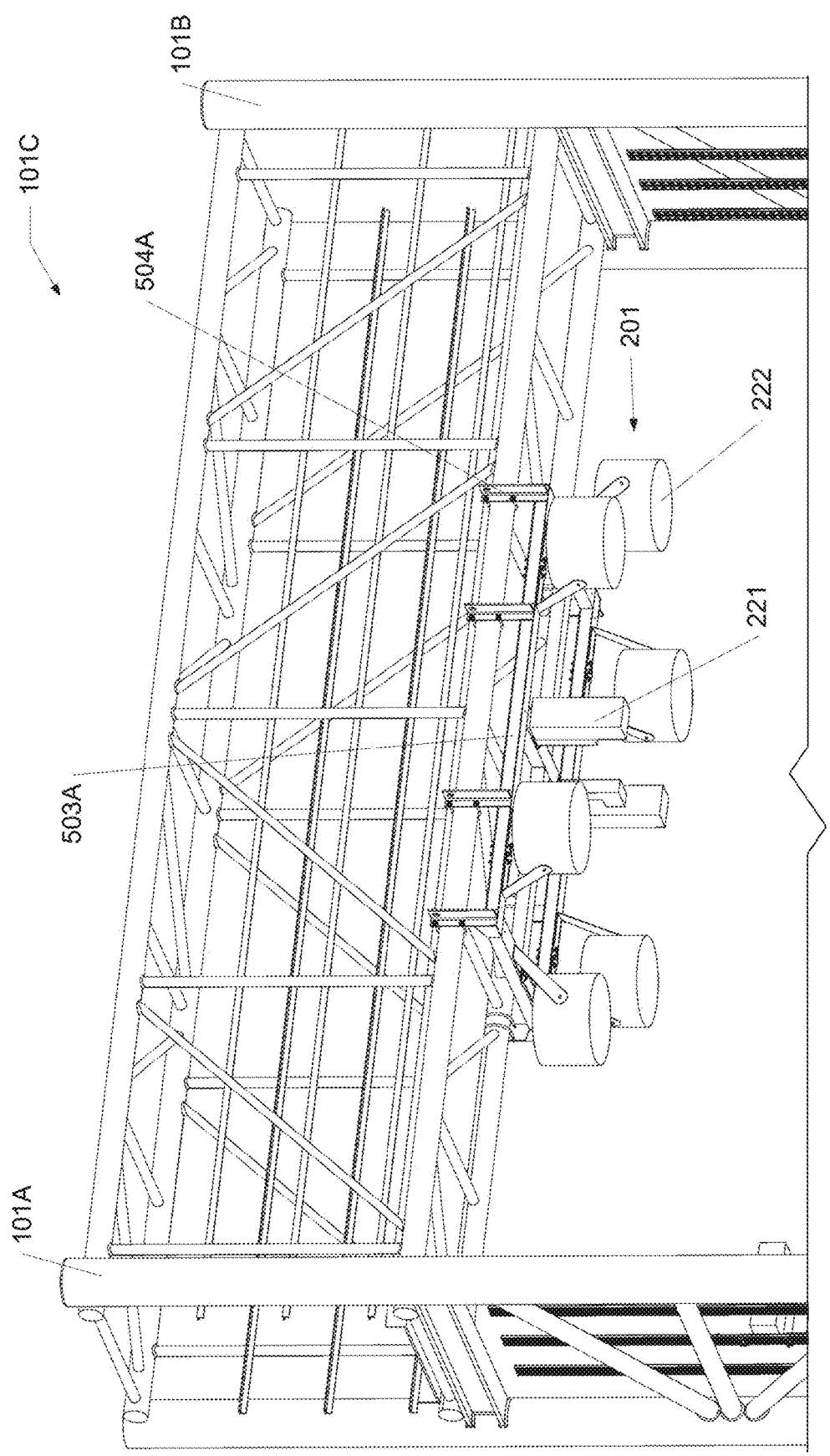
FIG. 5A illustrates an overhead portion, in accordance with the disclosed technology.

Referring now to FIG. 5A, illustrated is the overhead portion 101C, in accordance with the disclosed technology. The overhead portion 101C can connect both the first lateral portion 101A to the second lateral portion 101B. The overhead portion 101C can support the overhead inspection system 201. The overhead inspection system 201 can gather data in the downward direction 403. The overhead inspection system 201 can include the one or more cameras 221 and the one or more lights 222. The one or more cameras 221 can include one or more line-scan cameras and/or one or more area-scan cameras. For example, the overhead inspection system 201 can include two cameras, where a first camera is a line-scan camera, and a second camera is an area-scan camera. The cameras 221 and the lights 222 can connect to an overhead inspection system frame 503A. The overheard inspection system frame 503A can connect to the overhead portion 101C through one or more support connections 504A. For example, the support connections 504A can be fastened, bolted, and/or otherwise secured to the overhead portion 101C. The cameras 221 can be placed on the overhead inspection system frame 503A such that the cameras 221 are centered about the train track 104. The lights 222 can be arranged on the overhead inspection system frame 503A such that the cameras 221 are centered about a particular combination of lights 222. For example, the overheard inspection system 503A can include two cameras, both of which are centered about an oval configuration of six lights 222 (e.g., a set of three lights 222 to one side of the cameras 221 and a second set of three lights 222 to a second side of the camera 221, the second set of three lights 222 opposite the first set of three lights 222). Alternatively, one or both of the cameras can be off centered from the track.

Figure 5B:
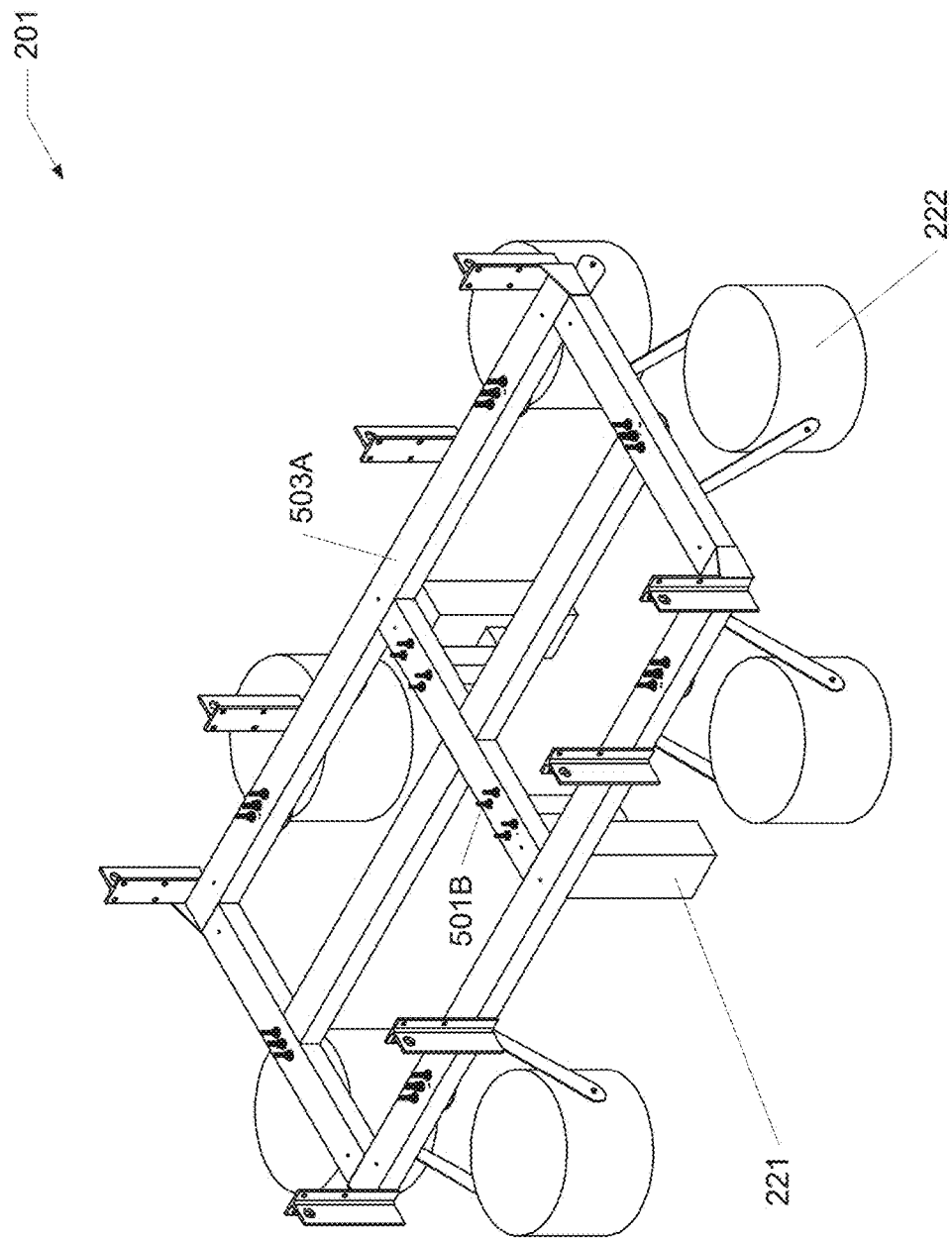
FIG. 5B illustrates an example perspective view of an overhead inspection system, in accordance with the disclosed technology.

Referring now to FIG. 5B, illustrated is an example perspective view of the overhead inspection system 201, in accordance with the disclosed technology. The overhead inspection system 201 can include the overhead inspection system frame 503A. The overhead inspection system frame 503A can function as the attachment point for the cameras 221 and the lights 222. For example, one or more bolts 501B can extend through the cameras 221 and/or lights 222 and into the overhead inspection system frame 503A to attach the camera 221 and/or the lights 222 to the overhead inspection system frame 503A.

Figure 5C:
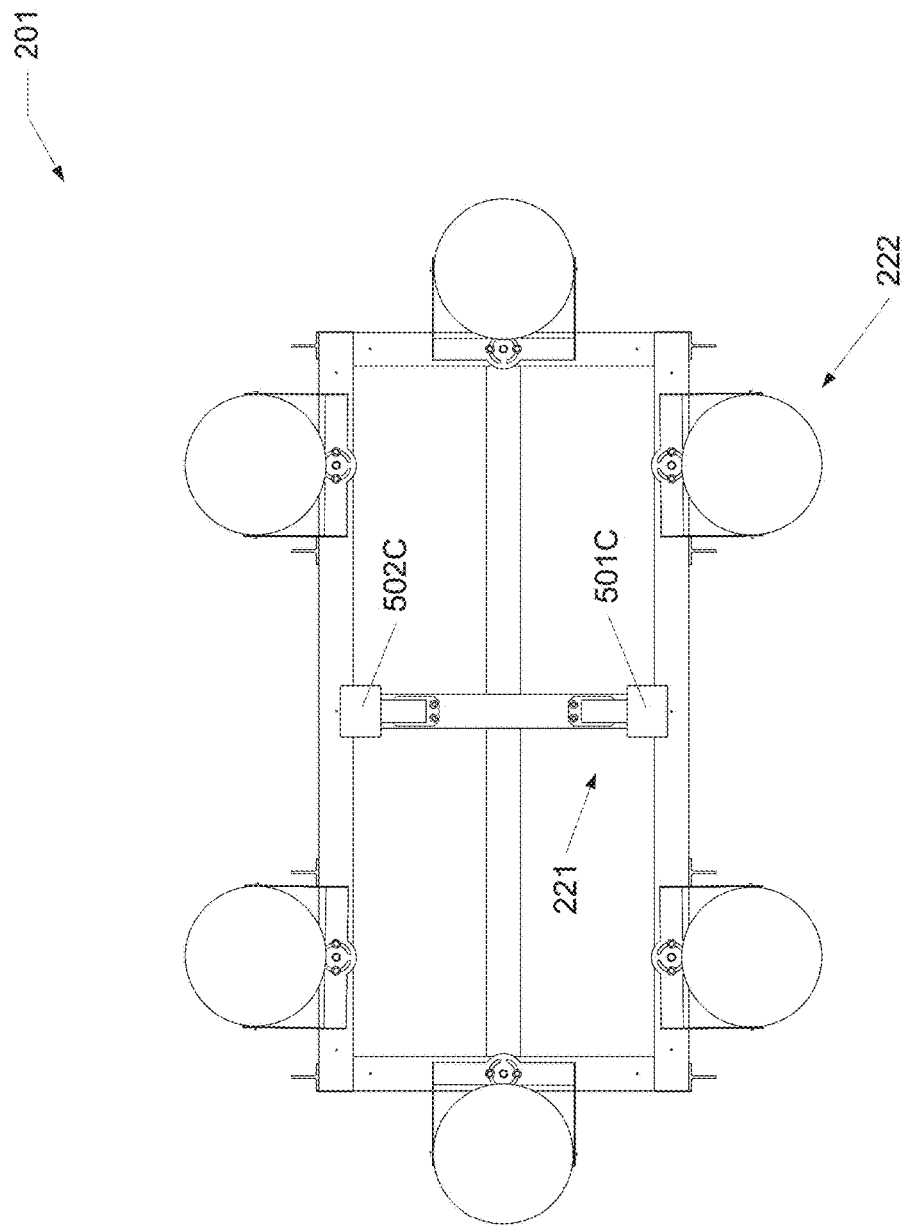
FIG. 5C illustrates an example bottom view of an overhead inspection system, in accordance with the disclosed technology.

Referring now to FIG. 5C, illustrated is a bottom view of the overhead inspection system 201, in accordance with the disclosed technology. The overhead inspection system 201 can include one or more cameras 221 and one or more lights 222. The overhead inspection system 201 can include a line-scan camera 501C and an area-scan camera 502C. The area-scan camera 502C can take area-scan images of particular regions of the top portion of the passing railcar 103. For example, the area-scan camera 502C can take pictures of one or more coupler components on the passing railcar 103. The line-scan camera 501C can take line-scan images of particular regions of the top portion of the passing railcar 103. For example, the line-scan camera 501C can take images of the entire length of the passing railcar 103. The cameras 221 can include any particular machine vision camera for capturing high-resolution images at increased rates of speed. The lights 222 can illuminate the region of image capture such that the cameras 221 can take clear images with less than 2 mm of blur on the passing railcar 103 that is moving at up to 70 miles per hour (mph). The cameras 221 and the lights 222 can include motorized components such that the cameras 221 and the lights 222 can be adjusted automatically and/or remotely. For example, if the cameras 221 are intended to capture a particular region of the passing railcar 103, the computing environment 203 can control the motorized components of the cameras 221 and adjust their pointing direction, as well as the focus or aperture of the lens of the cameras 221.

Figure 6A:
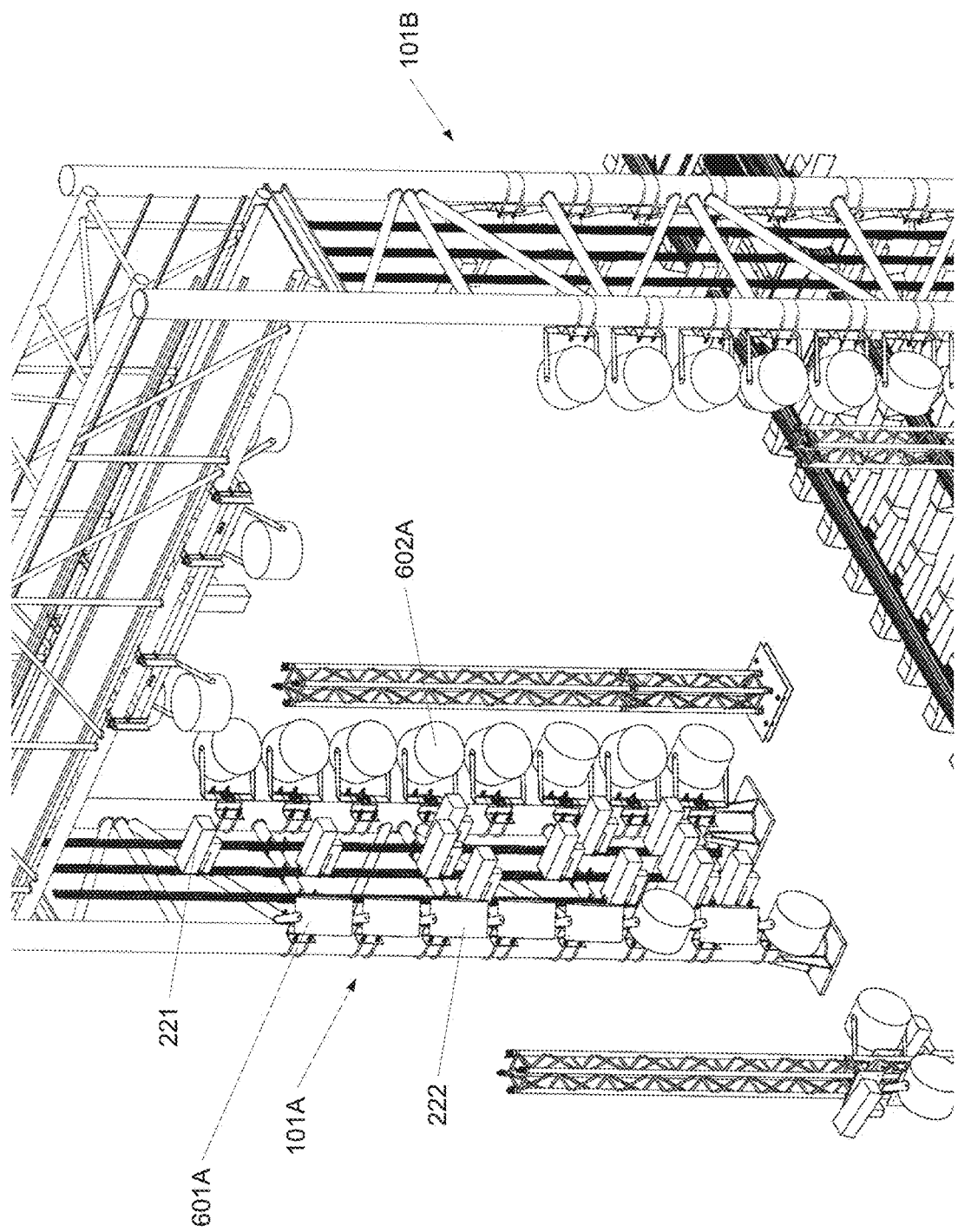
FIG. 6A illustrates a perspective view of a first lateral portion, in accordance with the disclosed technology.

Referring now to FIG. 6A, illustrated is a perspective view of the first lateral portion 101A, in accordance with the disclosed technology. The first lateral portion 101A and the second lateral portion 101B can be substantially similar. The first lateral portion 101A can include one or more cameras 221 and one or more lights 222. For example, the first lateral portion 101A can include twelve cameras 221 and sixteen lights 222. Similar to the cameras 221 and lights 222, the cameras 221 and the lights 222 can include motorized components such that the cameras 221 and the lights 222 can be adjusted automatically and/or remotely to point at particular regions of the railcar 103. The cameras 221 and lights 222 of the first lateral portion 101A can capture data from the first side of the railcar 103. The cameras 221 can include area-scan cameras and/or line-scan cameras. The lights 222 can be distributed in two arrays, where a first array 601A is at a first side of the first lateral portion 101A and the second array 602A is at a second side of the first lateral portion 101A. The first array 601A and the second array 602A can be divided by a gap, where one or more of the cameras 221 can be located. The first array 601A and the second array 602A can be in a generally vertical orientation.

The cameras 221 and/or any particular camera of the inspection portal system 200 can include a burst capture mode such that, for example, area-scan cameras can capture a specific piece of hardware or region of the railcar 103. For example, the cameras 221 of the first lateral portion 101A can capture a component, such as a particular nut, bolt, and/or pin located on the first side of the railcar 103. Continuing this example, there can be an optimal angle and/or vantage point from which to capture the particular component. Further continuing this example, it can be beneficial to capture an image right before that component, or the region in which it may be contained on the passing railcar 103, passes (capture #1), capture an image at the time that component, or the region in which it may be contained on the passing railcar 103, is approximately in the center of the frame of the camera 221 (capture #2), and capture an image soon after that that component, or the region in which it may be contained on the passing railcar 103, passes the center of the frame (capture #3), for a total of 3 "burst" captures. In capturing multiple images from slightly different vantage points, the computing environment 203 of the inspection portal system 200 can process those images (e.g., using a consensus, aggregation, or voting scheme) to generate better measurements and/or alerts and estimate a confidence value in those measurements or alerts. The timing and spacing of such burst captures can be a function of the speed of the passing railcar 103 or the trajectory of one or more axles of the passing railcar 103.

The cameras 221 and/or any particular camera of the inspection portal system 200 can include a continuous capture mode for the area-scan cameras. The continuous capture mode can be defined as a mode in which a particular camera 221 is continuously triggered (one image acquisition after another) for a particular duration (e.g., the duration of the passing of the railcar 103), with the rate of capture changing due to any speed changes of the train throughout its passing. The continuous capture mode can allow the camera 221 to capture at a rate that provides the desired "overlap" between images. Here, "overlap" can define how much of the same region of the railcar 103 is captured from one image to the next. For example, the first lateral portion 101A can include a particular camera 221 with a field of view of 60 inches of the railcar 103. Continuing this example, when a high degree of overlap occurs (e.g., 6 inches of train movement), the particular camera 221 can identify the high degree of overlap in a specific portion of the train from one frame to the next. Further continuing this example, the particular camera 221 of the inspection portal system 200 can capture approximately ten images of the specific portion of the train as the train passes.

The cameras 221 and/or any particular camera of the inspection portal system 200 can include a continuous capture mode for the line-scan cameras. Line-scan cameras can traditionally capture images continuously. For the line-scan cameras, the computing environment 203 of the inspection portal system 200 can dictate a rate of a trigger of each line of pixels and/or an exposure based on the speed of the railcar 103 at a time of capture. The line-scan cameras can perform burst image captures substantially similarly to the area-scan cameras.

Figure 6B:
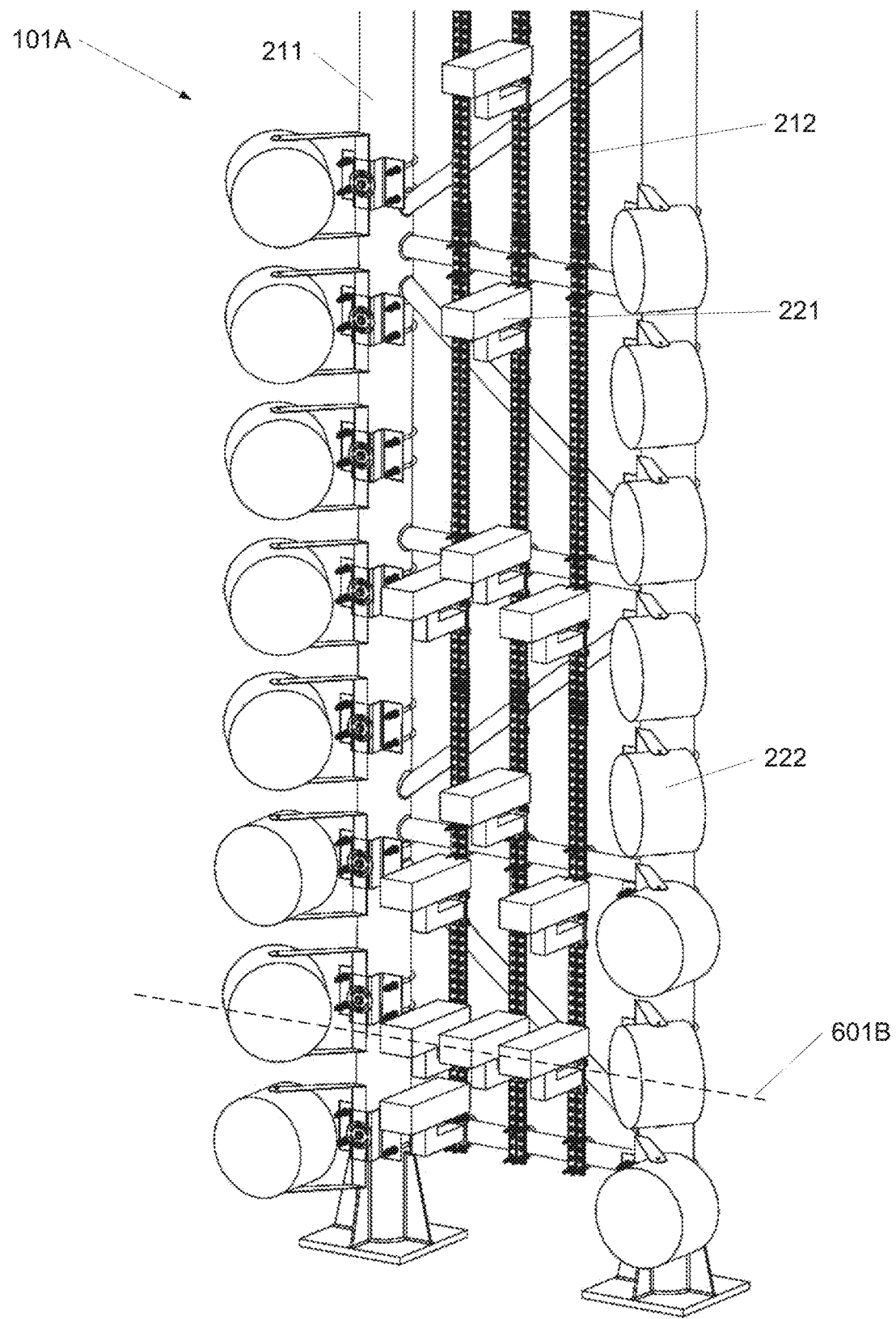
FIG. 6B illustrates a second perspective view of a first lateral portion, in accordance with the disclosed technology.

Referring now to FIG. 6B, illustrated is an example perspective view of the first lateral portion 101A, in accordance with the disclosed technology. The first lateral portion 101A can include the attachment points 212. The attachment points 212 can extend through the first lateral portion 101A and can function as a point of attachment for the cameras 221. The attachment points 212 can allow the first lateral portion 101A to function as a lateral system. For example, cameras 221, lights 222, and/or sensors can be removed, replaced, upgraded, and/or repaired by removing the particular component from the attachment points 212 and/or the frame 211 of the lateral portions 101A-B.

The cameras 221 can be arranged in any particular configuration. For example, two or more cameras 221 can be placed adjacently on a camera axis 601B parallel to the ground. In another example, the cameras 221 can be configured in a V configuration. The cameras 221 can be arranged in any particular configuration on the lateral portions 101A-B to perform specific image captures of particular regions, continuous captures, and/or burst captures depending on the needs of the inspection portal system 200. The cameras 221 and/or the lights 222 can include coolant systems such that their electrical components stay below a threshold temperature of operation.

Figure 7A:
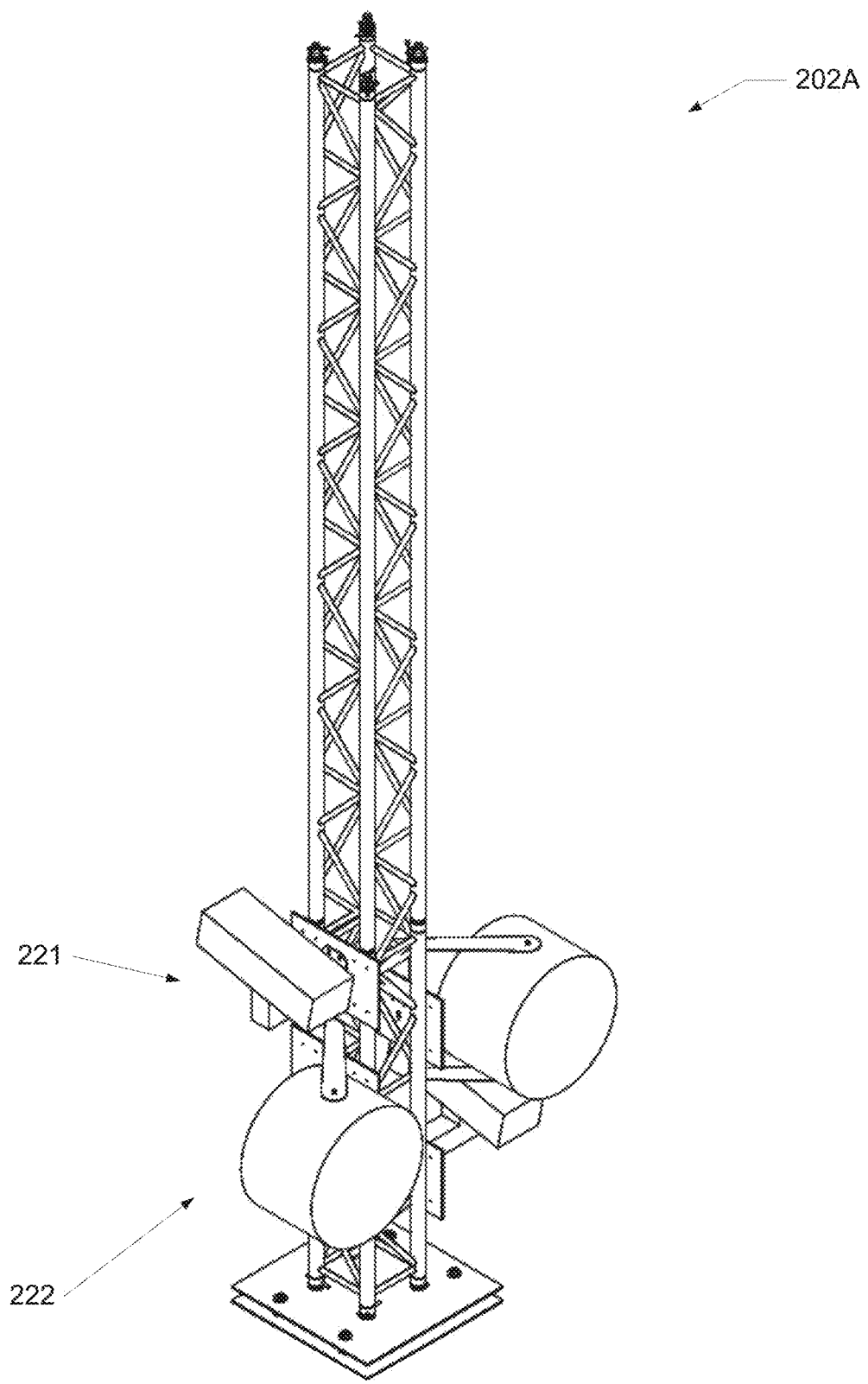
FIG. 7A illustrates an example perspective view of a first base inspection system, in accordance with the disclosed technology.

Referring now to FIG. 7A, illustrated is a perspective view of the first base inspection system 202A, in accordance with the disclosed technology. The first base inspection system 202A can be substantially similar to the second base inspection system 202B. The base inspection systems 202A, 202B can be independent structures from the portal structure 101 (not shown). For example, the base inspection systems 202A, 202B can be bolted to the ground on both sides of the train track 104. The base inspection systems 202A, 202B can include one or more cameras 221 and/or lights 222 to image one or more brake components of the passing railcar 103. The camera 221 can be configured to capture images of only a specific region of the railcar 103, (e.g., a region in which one or more specific components are located). The cameras 221 of the base inspection systems 202A, 202B can gather data on the brake shoe of the passing railcar 103.

Figure 7B:
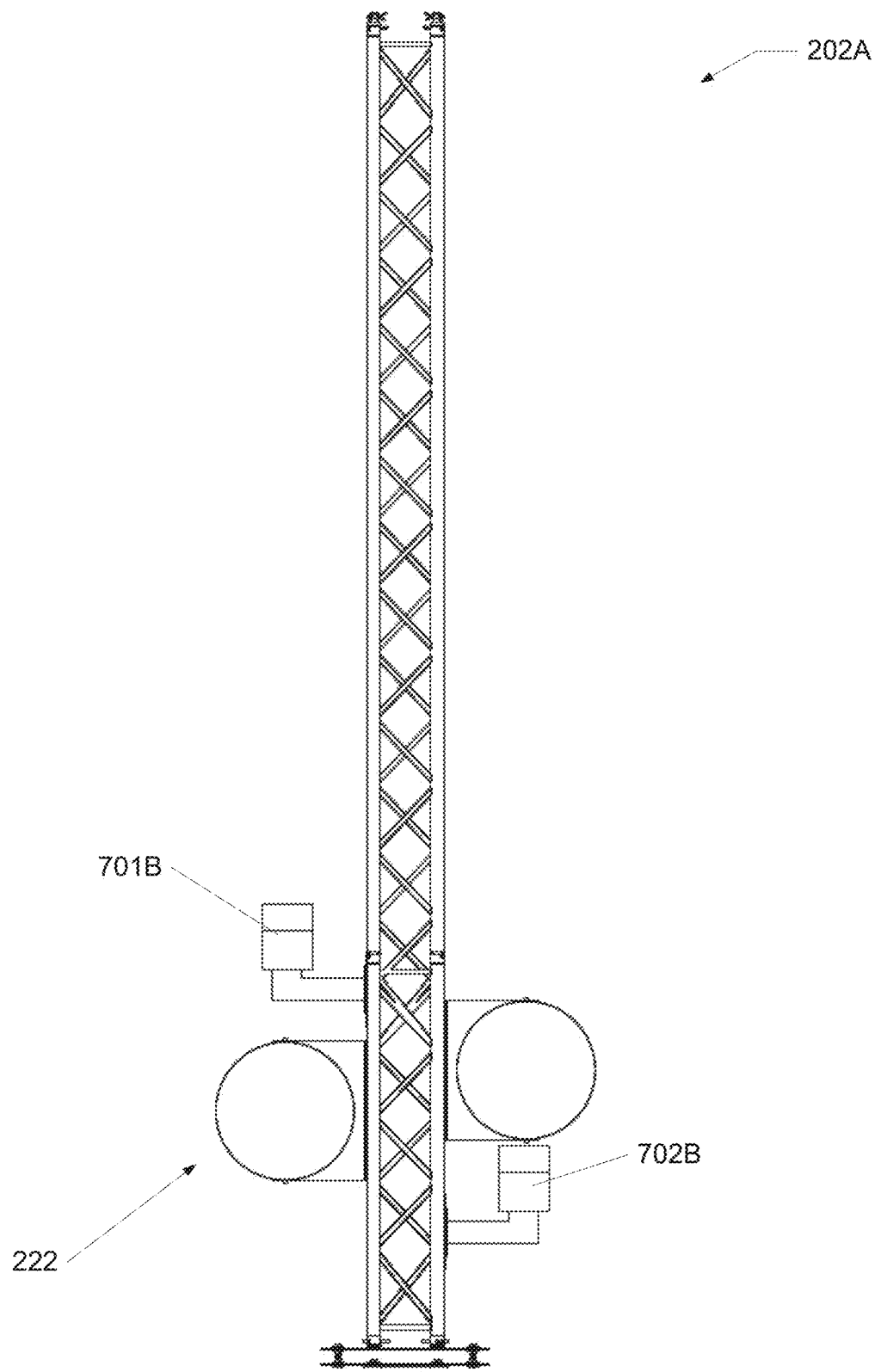
FIG. 7B illustrates an example front view of a first base inspection system, in accordance with the disclosed technology.

Referring now to FIG. 7B, illustrated is a front view of the first base inspection system 202A, in accordance with the disclosed technology. The first base inspection system 202A can include a first camera 701B and a second camera 702B. The first camera 701B can be positioned at a position higher than the second camera 702B. Though illustrated as attached to the first base inspection system 202A, the second camera 702B can optionally be secured to the ground and angled upwards towards the brake-shoes of the passing railcar 103. The first camera 701B can image the upper brake through a viewing porthole on the train car trucks of the railcar 103. The second camera 702B can point upward to image the bottom half of the brake shoe of the railcar 103. The lights 222 can illuminate the brake-shoe of the passing railcar 103 such that the first camera 701B and the second camera 702B can capture images with less than 2 mm of blur of a particular railcar 103 traveling at speeds of at least 70 mph, 70 mph, or less than 70 mph. The first camera 701B and the second camera 702B can include coolant systems such that their electrical components stay below a threshold temperature of operation. The first camera 701B and the second camera 702B can include line-scan cameras and/or area-scan cameras.

Figure 7C:
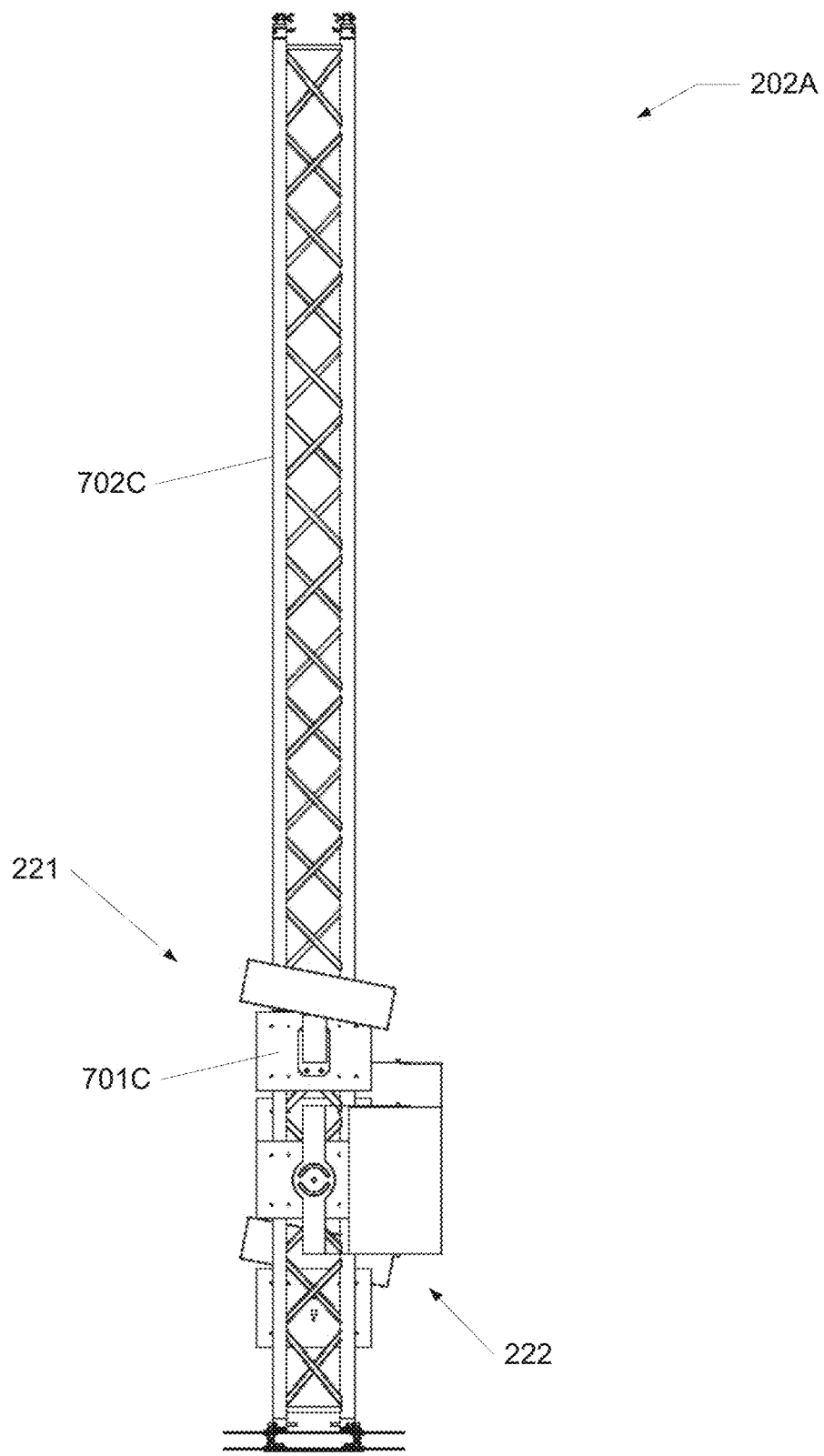
FIG. 7C illustrates an example side view of a first base inspection system, in accordance with the disclosed technology.

Referring now to FIG. 7C, illustrated is an example side view of the first base inspection system 202A, in accordance with the disclosed technology. The cameras 221 and the lights 222 of the first base inspection system 202A can attach to the first base inspection system 202A along a base truss structure 702C. For example, the cameras 221 and the lights 222 can include attachment plates 701C. The attachment plates can secure the cameras 221 and the lights 222 to the base truss structure 702C. The cameras 221 and the lights 222 can include motorized systems such that the computing environment 203 and/or any other particular resource can automatically and/or remotely reposition the cameras 221 and/or lights 222.

Figure 8:
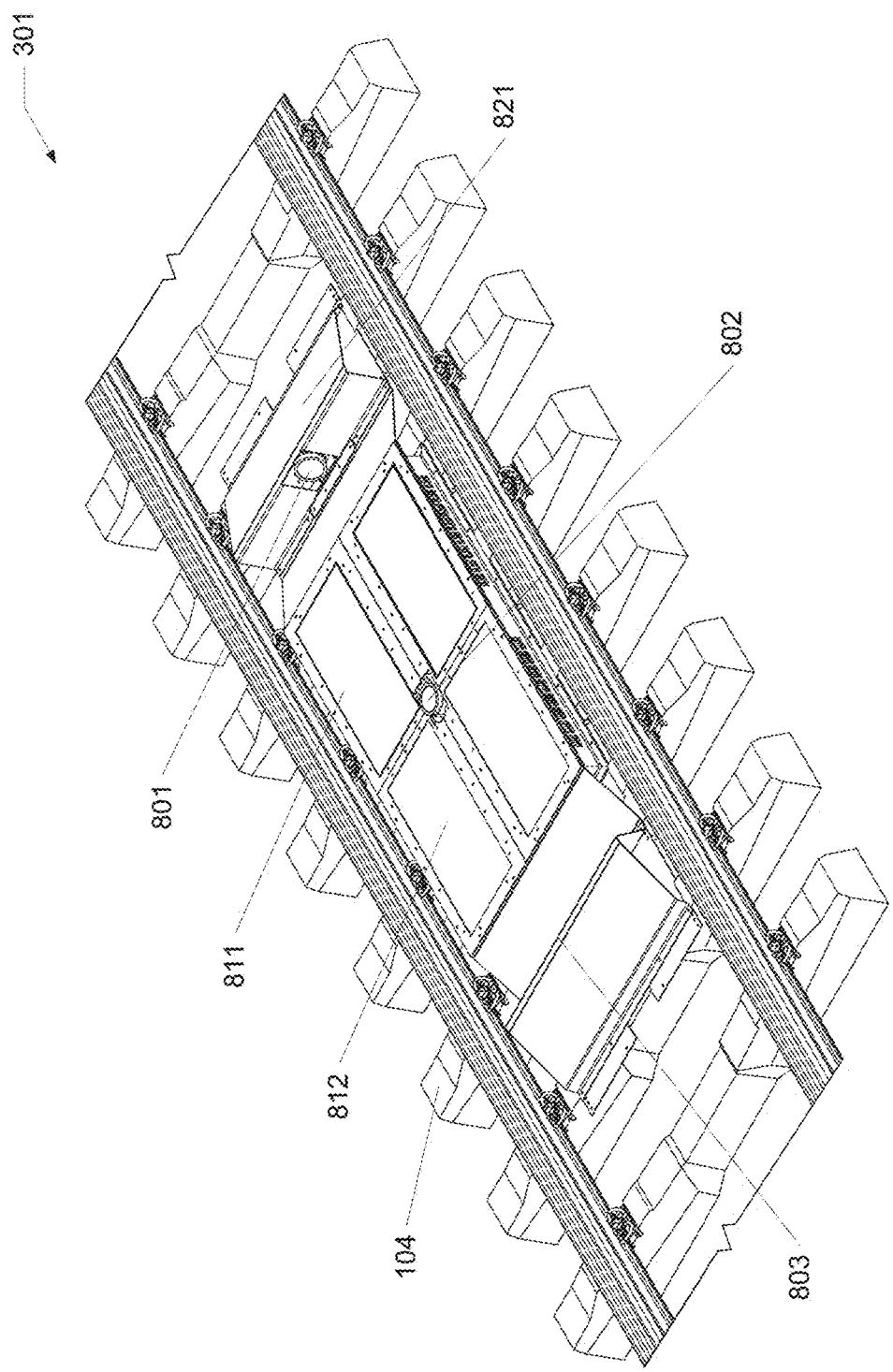
FIG. 8 illustrates a perspective view of an undercarriage area-scan inspection system, in accordance with the disclosed technology.

Referring now to FIG. 8, illustrated is a perspective view of the undercarriage area-scan inspection system 301, in accordance with the disclosed technology.

The undercarriage area-scan inspection system 301 can include a first angled camera 801, a vertical camera 802, and a second angled camera 803. The first angled camera 801, the vertical camera 802, and the second angled camera 803 can be directed to a specific three-dimensional space. Stated differently, the first angled camera 801, the vertical camera 802, and the second angled camera 803 can be targeted at a specific point such that the first angled camera 801, the vertical camera 802, and the second angled camera 803 are focused on one or more specific components, elements, and/or portions of a passing railcar 103.

Each of the cameras of the undercarriage area-scan inspection system 301 can include a housing and a compressed air system. The housings of the cameras of the undercarriage area-scan inspection system 301 can protect the cameras during use as a passing railcar 103 passes over the undercarriage area-scan inspection system 301. The compressed air systems can generate air curtains over the lenses of each of the cameras such that debris does not obstruct or damage the lenses of the cameras of the undercarriage area-scan inspection system 301. The first angled camera 801 and the second angled camera 803 can each include a protective cover 821 to protect the cameras during use. The undercarriage area-scan inspection system 301 cameras can generate area-scan images of the undercarriage of the passing railcar 103. The undercarriage area-scan inspection system 301 can include one or more lighting arrays 811. The lighting arrays 811 can be covered by lighting covers 812 to protect the lighting arrays 811 from debris during use. The light arrays 811 can illuminate the particular area of interest for data acquisition. The undercarriage area-scan inspection system 301 can be centered about the train track 104.

Figure 9:
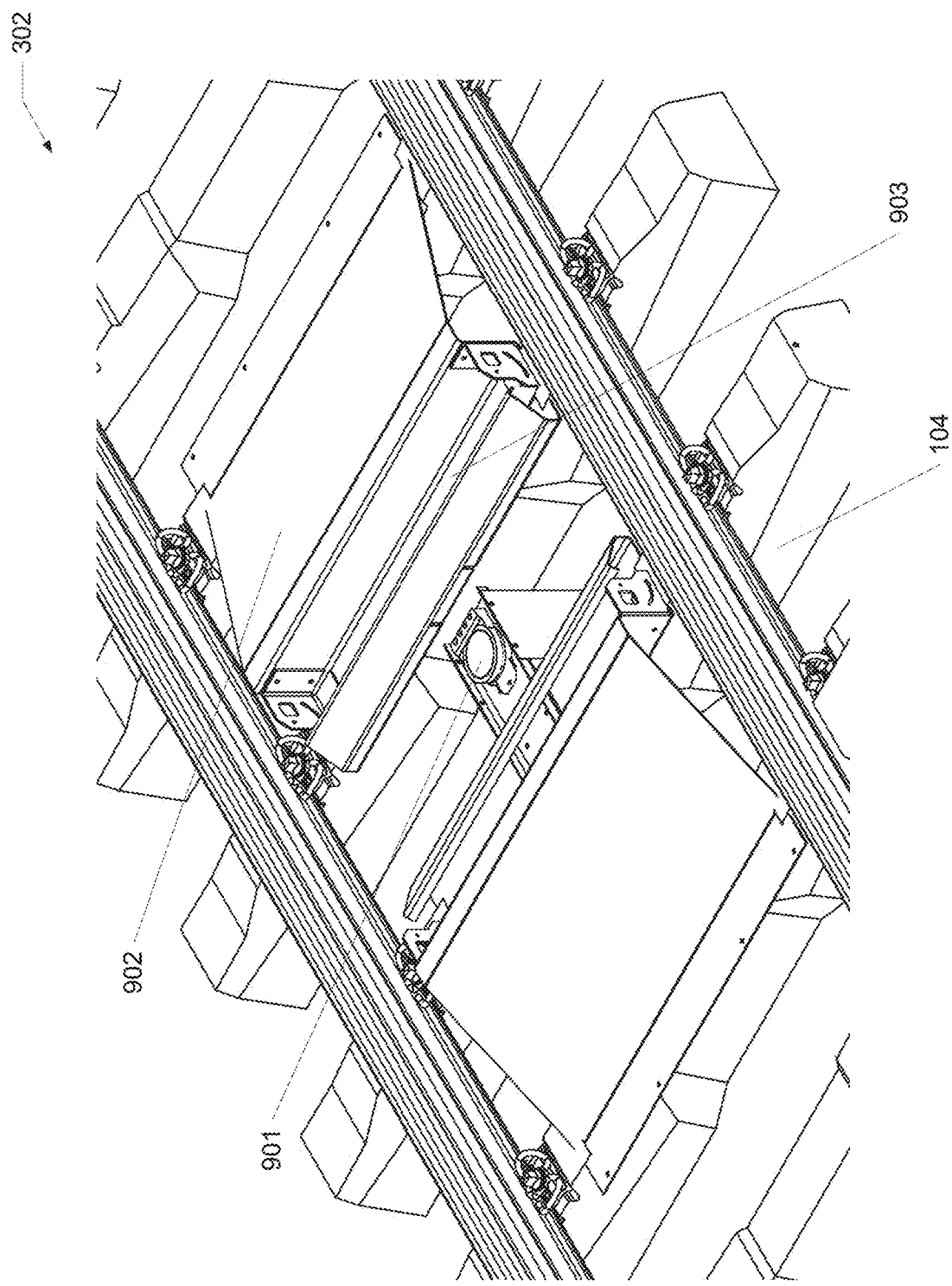
FIG. 9 illustrates a perspective view of an undercarriage line-scan inspection system, in accordance with the disclosed technology.

Referring now to FIG. 9, illustrated is a perspective view of the undercarriage line-scan inspection system 302, in accordance with the disclosed technology.

The undercarriage line-scan inspection system 302 can generate line-scan images of the undercarriage of the passing railcar 103. The undercarriage line-scan inspection system 302 can include a line-scan camera 901. The line-scan camera 901 can be directed to a specific three-dimensional space. Stated differently, each the line-scan camera 901 can be targeted at a specific point such that the corresponding the line-scan camera 901 is focused on one or more specific components, elements, and/or portions of a passing railcar 103. The line-scan camera 901 can be positioned below the level of the train track 104 and can be perpendicular to the ground. The line-scan camera 901 can aim directly upwards and record images of the undercarriage of the passing railcar 103. The undercarriage line-scan inspection system 302 can include one or more shields 902. The one or more shields 902 can protect the line scan camera 901 from debris while a particular railcar 103 passes over the undercarriage line-scan inspection system 302. The one or more shields 902 can include a lighting strip 903. The lighting strip 903 can illuminate vertically towards the undercarriage of the passing railcar 103 as it passes over the undercarriage area-scan inspection system 301. The lighting strip 903 can illuminate a region of the undercarriage of the passing railcar 103 as the line-scan camera 901 captures images of the particular railcar 103.

Figure 10:
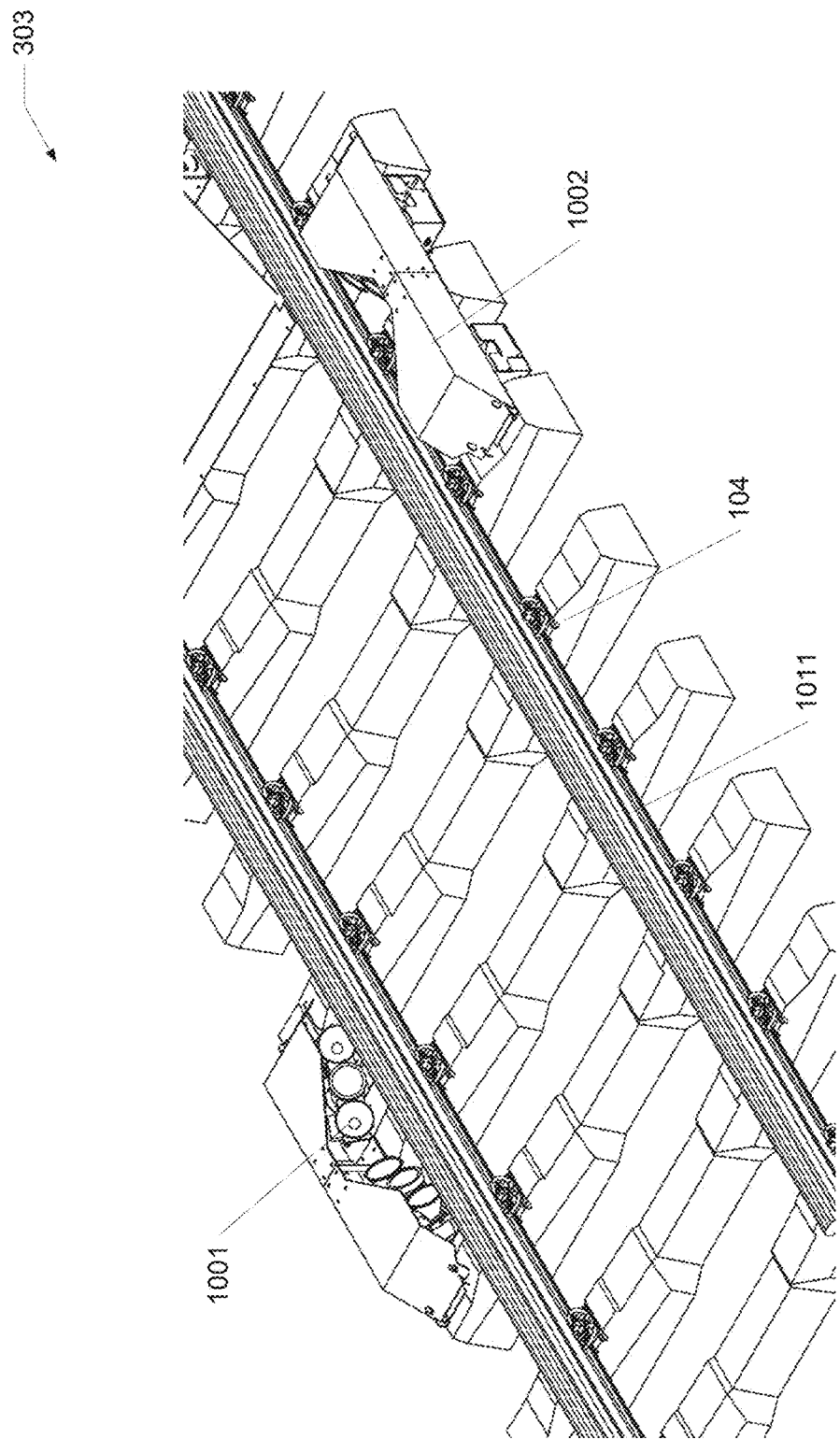
FIG. 10 illustrates a perspective view of a rail-side inspection assembly, in accordance with the disclosed technology.

Referring now to FIG. 10, illustrated is a perspective view of the rail-side inspection assembly 303, in accordance with the disclosed technology.

The rail-side inspection assembly 303 can generate images of the cross-key components of the passing railcar 103, among other components. The rail-side inspection assembly 303 can include a camera and light array 1001 aimed at the lower portion of the passing railcar 103. The camera and light array 1001 can include line-scan cameras, area-scan cameras, and/or any particular set of cameras to generate images of the cross-key components of the passing railcars 103, among other components. For example, the camera and light array 1001 can include one camera (e.g., a line-scan camera or an area-scan camera) and two adjacent lights. The camera and light array 1001 can be directed to a specific three-dimensional space. Stated differently, each the camera and light array 1001 can be targeted at a specific point such that the corresponding the camera and light array 1001 is focused on one or more specific components, elements, and/or portions of a passing railcar 103. The rail-side inspection assembly 303 can include two independent systems used to capture data on both sides of the passing railcar 103. A first system can be positioned on the first side of the train track 104 and a second system can be positioned on the second side of the train track 104. The rail-side inspection assembly 303 can be positioned adjacent to one or more rails 1011 of the train track 104.

Figure 11:
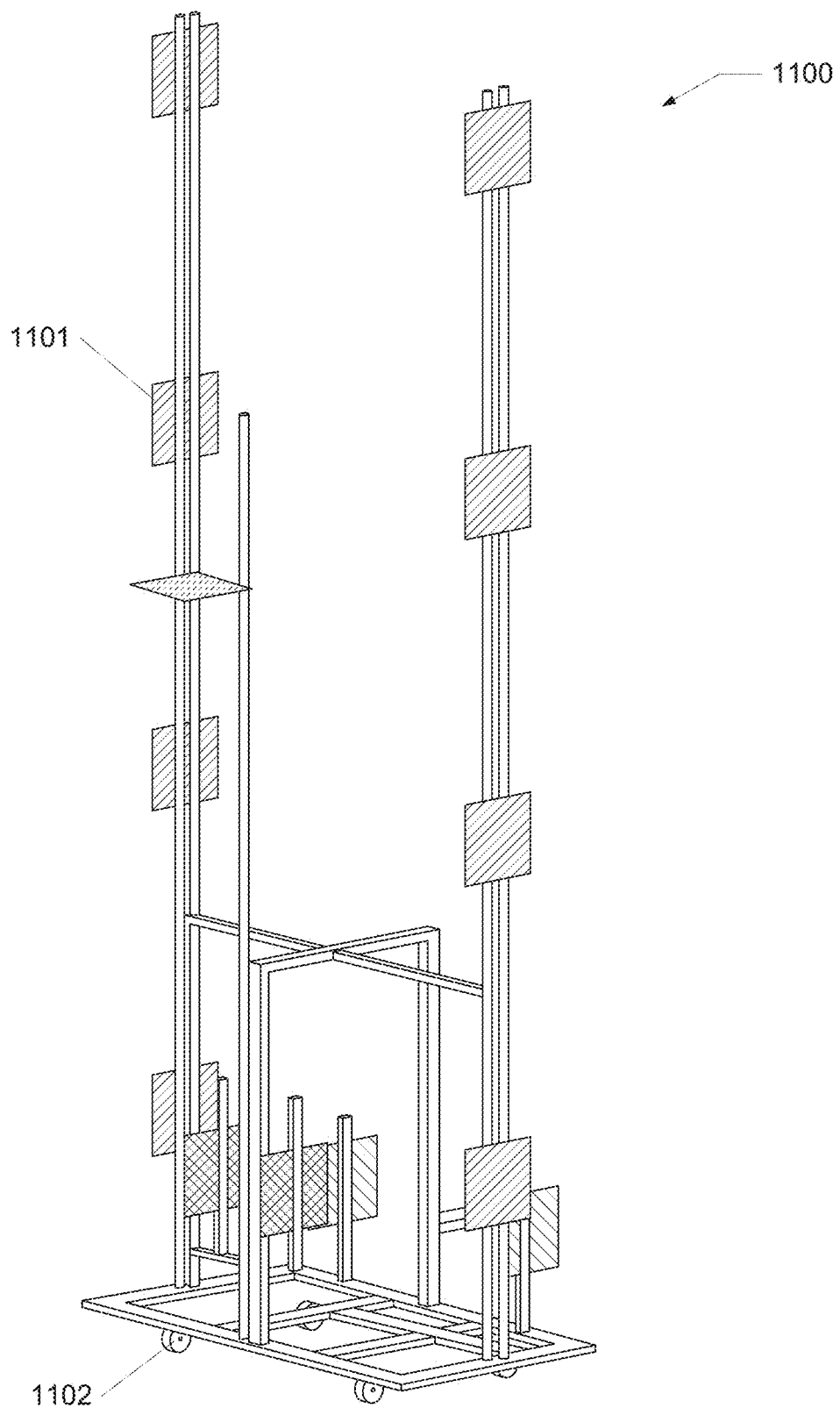
FIG. 11 illustrates a perspective view of a portal focus cart, in accordance with the disclosed technology.

Referring now to FIG. 11, illustrated is a perspective view of a portal focus cart 1100, in accordance with the disclosed technology. The cameras of the inspection portal system 200 can focus to the components or regions of interest of the passing railcar 103. For example, during installation of the inspection portal system 200 (and/or periodically following the initial installation), the inspection portal system 200 can use the portal focus cart 1100 to calibrate one or more sensors and/or cameras of the inspection portal system 200. Such an apparatus can have various targets 1101 placed at various locations within the portal focus cart 1100 such that focusing cameras on those regions can produce the desired results when the passing railcar 103 travels through the inspection portal system 200. Such targets 1101 can have fiducial markers such that their location and orientation may be automatically detected by image processing algorithms of the computing system applied to the image feeds from the cameras. The portal focus cart 1100 may also have wheels 1102 and one or more motor(s) such that it can be placed on the train tracks 104 and moved within the inspection portal system 200. The portal focus cart can pass through the system at some speed so as to mimic a passing railcar 103. Various components of the portal focus cart 1100 can collapse or telescope such that the portal focus cart 1100 can be stored and transported more conveniently. The portal focus cart 1100 can also be configured so as to set the depth of field as desired, for example through the use of multiple focusing targets 1101.

The foregoing description of the present systems and processes has been presented only for the purposes of illustration and description and is not intended to be exhaustive or to limit the innovations to the precise forms disclosed. Many modifications and variations are possible in light of the above teaching.

For example, the disclosed technology is described herein with reference to detecting defects in railcars (or other rail-bound vehicles) or components thereof, but the disclosed technology is not so limited. Stated differently, the disclosed technology includes systems, assemblies, devices, and/or methods for detecting defects in any type of moving object (e.g., cars, trucks, boats, planes, other vehicles). As a more specific example, the disclosed technology includes inspection portals for vehicles (e.g., delivery trucks, warehouse vehicles such as forklifts, or other vehicles) and can be configured to detect any defects or potential defects in such vehicles as they drive through the inspection portal (e.g., along a predetermined path, whether manually or under automated control).

The examples of the present systems and processes were chosen and described in order to explain the principles of the claimed innovations and their practical application so as to enable others skilled in the art to utilize the innovations and various examples with various modifications as are suited to the particular use contemplated. Alternative examples of the disclosed technology will become apparent to those skilled in the art to which the claimed innovations pertain without departing from their spirit and scope. Accordingly, the scope of the claimed innovations is defined by the appended claims rather than the foregoing description and the examples described therein.

What is claimed is:

1. An inspection portal system comprising:
   a support structure comprising a first side, a second side, and a top side supported by the first and second sides, the support structure configured to span across a railroad track and to permit a train to pass therethrough;
   an overhead inspection system attached to the top side, the overhead inspection system comprising one or more overhead cameras comprising an overhead line scan camera and an overhead area scan camera, and one or more overhead lights;
   a first side inspection system attached to the first side of the support structure, the first side inspection system comprising one or more first cameras and one or more first lights and configured to capture images of a first side of a railcar;
   a second side inspection system attached to the second side of the support structure, the second side inspection system comprising one or more second cameras and one or more second lights and configured to capture images of a second side of the railcar;
   an undercarriage inspection system comprising one or more undercarriage inspection assemblies, each of the one or more undercarriage inspection assemblies being located between the rails of a railway and comprising one or more undercarriage cameras and one or more undercarriage lights; and
   one or more tie-mounted inspection assemblies, each of the one or more tie-mounted inspection assemblies being attached to one or more ties of a railway at a location outside the rails of the railway, and comprising one or more third cameras and one or more third lights;
   one or more wheel detection sensors configured to detect a presence or a non-presence of a railcar wheel at a location along the railway that is upstream from the support structure;
   one or more computing devices in electrical communication with:
      the one or more wheel detection sensors;
      inspection portal cameras comprising the one or more overhead cameras, the one or more first cameras, the one or more second cameras, the one or more undercarriage cameras, and the one or more third cameras; and
      inspection portal lights comprising the one or more overhead lights, the one or more first lights, the one or more second lights, the one or more undercarriage lights, and the one or more third lights, wherein the one or more computing devices is configured to determine a capture timing for each of the inspection portal cameras based at least in part on a train speed estimation determined according to wheel detection events detected by the wheel detection sensors,
   wherein the one or more computing devices is further configured to determine the capture timing for each of the inspection portal cameras based on a physical distance between the wheel detection sensors and each corresponding one of the inspection portal cameras.

2. The inspection portal system of claim 1, further comprising a weather housing comprising a first wall, a second wall, a roof, a first open end, and a second open end, wherein the weather housing covers the support structure, and is configured to permit a train to pass therethrough via the first open end and the second open end.

3. The inspection portal system of claim 1, wherein at least one of the one or more first cameras, the one or more second cameras, the one or more undercarriage cameras, or the one or more third cameras is a line scan camera.

4. The inspection portal system of claim 1, wherein at least one of the one or more first cameras, the one or more second cameras, the one or more undercarriage cameras, or the one or more third cameras is an area scan camera.

5. The inspection portal system of claim 1, further comprising:
a second support structure comprising a third side inspection system configured to capture images of a region of the first side of the railcar, the third side inspection system comprising one or more fourth cameras and one or more fourth lights; and
a third support structure comprising a fourth side inspection system configured to capture images of a region of the second side of the railcar, the fourth side inspection system comprising one or more fifth cameras and one or more fifth lights.

6. The inspection portal system of claim 5, wherein the third side inspection system is configured to capture images of a brake and/or shoe region of the first side of the railcar and the fourth side inspection system is configured to capture images of a brake and/or shoe region of the second side of the railcar.

7. The inspection portal system of claim 1, wherein the one or more computing devices is further configured to determine the capture timing for each of the inspection portal cameras based on one or more electrical signal transmission or processing latencies.

8. The inspection portal system of claim 1, wherein the one or more wheel detection sensors comprises one or more pressure switches attached to the railway.

9. The inspection portal system of claim 1, wherein the one or more wheel detection sensors comprises one or more light curtains.

10. The inspection portal system of claim 1, wherein the one or more wheel detection sensors comprises one or more microphones, the one or more computing devices being configured to recognize one or more sounds indicative of train wheels passing by the one or more microphones.

11. The inspection portal system of claim 1, wherein the one or more overhead cameras, the one or more first cameras, the one or more second cameras, the one or more undercarriage cameras, and the one or more third cameras are each located in a respective weather-resistant housing.

12. The inspection portal system of claim 1, further comprising a compressed air source, wherein at least one of the one or more undercarriage inspection assemblies or the one or more tie-mounted inspection assemblies comprises an air curtain configured to blow air across an optical end of the one or more undercarriage cameras or the one or more third cameras.

13. The inspection portal system of claim 1, wherein at least some of the one or more first lights form a first array of first lights and at least some of the one or more second lights form a second array of second lights.

14. The inspection portal system of claim 1, wherein:
at least some of the one or more first lights form a first array of first lights and a second array of first lights, the first array of first lights being arranged in a generally vertical orientation along at least a first portion of the first side of the support structure, and the second array of first lights being arranged in a generally vertical orientation along at least a second portion of the first side of the support structure; and
at least some of the one or more second lights form a first array of second lights and a second array of second lights, the first array of second lights being arranged in a generally vertical orientation along at least a first portion of the second side of the support structure, and the second array of second lights being arranged in a generally vertical orientation along at least a second portion of the second side of the support structure.

15. The inspection portal system of claim 14, wherein:
at least some of the first lights of the first array of first lights are pointed in a direction that is different from a direction in which some others of the first lights of the first array of first lights are pointed;
at least some of the first lights of the second array of first lights are pointed in a direction that is different from a direction in which some others of the first lights of the second array of first lights are pointed;
at least some of the second lights of the first array of second lights are pointed in a direction that is different from a direction in which some others of the second lights of the first array of second lights are pointed; and
at least some of the second lights of the second array of second lights are pointed in a direction that is different from a direction in which some others of the second lights of the second array of second lights are pointed.

16. The inspection portal system of claim 14, wherein:
there is a first gap between the first array of first lights and the second array of first lights;
at least some of the one or more first cameras are positioned within the first gap;
there is a second gap between the first array of second lights and the second array of second lights; and
at least some of the one or more second cameras are positioned within the second gap.

17. The inspection portal system of claim 1, wherein at least some of the one or more overhead cameras, the one or more first cameras, the one or more second cameras, the one or more undercarriage cameras, or the one or more third cameras are positioned, angled, and focused to capture images of one or more respective particular components of a passing railcar.

18. The inspection portal system of claim 1, wherein at least some of the one or more overhead cameras, the one or more first cameras, the one or more second cameras, the one or more undercarriage cameras, or the one or more third cameras are positioned, angled, and focused to capture images of one or more respective particular regions of a passing railcar.

* * * * *